(12) United States Patent
Hasegawa

(10) Patent No.: US 11,572,677 B2
(45) Date of Patent: Feb. 7, 2023

(54) WORK VEHICLE

(71) Applicant: YANMAR CO., LTD., Osaka (JP)

(72) Inventor: Takumi Hasegawa, Osaka (JP)

(73) Assignee: YANMAR POWER TECHNOLOGY CO., LTD., Osaka (JP)

( * ) Notice: Subject to any disclaimer, the term of this patent is extended or adjusted under 35 U.S.C. 154(b) by 0 days.

(21) Appl. No.: 16/782,452

(22) Filed: Feb. 5, 2020

(65) Prior Publication Data

US 2020/0173147 A1 Jun. 4, 2020

Related U.S. Application Data

(63) Continuation of application No. 15/521,727, filed as application No. PCT/JP2015/079643 on Oct. 21, 2015, now Pat. No. 10,590,630.

(30) Foreign Application Priority Data

Oct. 27, 2014 (JP) .................................. 2014-218763
May 26, 2015 (JP) .................................. 2015-106874

(51) Int. Cl.
*E02F 9/26* (2006.01)
*B62D 49/00* (2006.01)
(Continued)

(52) U.S. Cl.
CPC ................ *E02F 9/26* (2013.01); *B60K 35/00* (2013.01); *B60K 37/06* (2013.01); *B62D 49/00* (2013.01); *E02F 3/3417* (2013.01); *E02F 9/264* (2013.01); *B60K 2370/135* (2019.05); *B60K 2370/161* (2019.05); *B62D 49/0614* (2013.01); *E02F 9/2004* (2013.01)

(58) Field of Classification Search
CPC . E02F 3/436; E02F 3/437; E02F 3/438; E02F 3/439; E02F 9/26; E02F 9/264; E02F 9/265
USPC .................... 37/414; 414/698, 699, 700, 701
See application file for complete search history.

(56) References Cited

U.S. PATENT DOCUMENTS 5,854,988 A 12/1998 Davidson
7,300,241 B2 11/2007 Fukudome et al.
(Continued)

FOREIGN PATENT DOCUMENTS

CN 1395641 A 2/2003
CN 103459729 A 12/2013
(Continued)

OTHER PUBLICATIONS

Korean Office Action dated Jul. 19, 2018 issued in corresponding KR Application 10-2017-7013055.
(Continued)

*Primary Examiner* — Saul Rodriguez
*Assistant Examiner* — Brendan P Tighe
(74) *Attorney, Agent, or Firm* — Norton Rose Fulbright US LLP

(57) ABSTRACT

A work vehicle allows an operator to easily check the vertical position and the angle of bucket. The work vehicle includes a front loader with a bucket, and freely raises/lowers and rotates the bucket. The work vehicle comprises a display disposed near an operator seat. The display is configured to display vertical position information and angle information of the bucket.

20 Claims, 22 Drawing Sheets

(51) Int. Cl.
B60K 37/06 (2006.01)
B60K 35/00 (2006.01)
E02F 3/34 (2006.01)
B62D 49/06 (2006.01)
E02F 9/20 (2006.01)

(56) References Cited

U.S. PATENT DOCUMENTS

| | | | |
|---|---|---|---|
| 9,540,786 | B2 | 1/2017 | Ogawa |
| 2003/0001751 | A1* | 1/2003 | Ogura .................... E02F 9/2296 340/691.6 |
| 2006/0073003 | A1 | 4/2006 | Fukudome et al. |
| 2011/0178677 | A1 | 7/2011 | Finley et al. |
| 2014/0100744 | A1* | 4/2014 | Johnson ................ E02F 3/3677 701/50 |
| 2014/0271074 | A1 | 9/2014 | Ogawa |
| 2021/0062473 | A1* | 3/2021 | Ding ...................... G06F 3/1446 |
| 2022/0268000 | A1* | 8/2022 | Song ........................ E02F 3/32 |

FOREIGN PATENT DOCUMENTS

| | | | |
|---|---|---|---|
| CN | 103635637 | A | 3/2014 |
| EP | 0811728 | A1 | 12/1997 |
| JP | 10103925 | A * | 4/1998 ................ E02F 9/26 |
| JP | 10103925 | A | 4/1998 |
| JP | H10103925 | A | 4/1998 |
| JP | H11247239 | A | 9/1999 |
| JP | 2001090120 | A | 4/2001 |
| JP | 2001159156 | A | 6/2001 |
| JP | 2004068433 | A | 3/2004 |
| JP | 2006077473 | A | 3/2006 |
| JP | 2012188862 | A | 10/2012 |
| JP | 2014177784 | A | 9/2014 |
| KR | 2002-0065623 | A | 8/2002 |
| KR | 2009-0131085 | A | 12/2009 |

OTHER PUBLICATIONS

Korean Office Action dated Dec. 26, 2018 issued in corresponding KR Application 10-2017-7013055.
Chinese Office Action dated Feb. 22, 2019 issued in corresponding CN Application 201580058801.6.
Japanese Office Action dated Jul. 23, 2019 to the corresponding Japanese Patent Application No. 2015-106874.
Extended European Search Report for corresponding Application No. 15853647.4-1710/3214229 PCT/JP2015079643, dated Oct. 20, 2017.
International Search Report corresponding to Application No. PCT/JP2015/079643; dated Dec. 22, 2015.

* cited by examiner

WORK VEHICLE

CROSS REFERENCE TO RELATED APPLICATIONS

This application is a continuation from U.S. application Ser. No. 15/521,727 filed Apr. 25, 2017, which is the US national stage of International Application No. PCT/JP2015/079643 filed Oct. 21, 2015, which claims priority to JP Application No. 2014-218763 filed Oct. 27, 2014 and JP Application No. 2015-106874 filed May 26, 2015; the disclosure of each application is incorporated herein by reference.

TECHNICAL FIELD

The present invention relates to a work vehicle, and more particularly, to a work vehicle having a display.

BACKGROUND ART

Conventionally, tractors have been known as a representative example of work vehicles. Tractors can be equipped with a work machine having a bucket. The tractors carry earth and soil by raising/lowering and rotating the bucket (see Patent Document 1).

The operator of such a tractor is required to operate the tractor while checking the movement of the bucket. However, the operator may be unfamiliar with the operation of the work machine, and thus a technique that allows the operator to operate the tractor while checking the vertical position or the angle of the bucket. Accordingly, a work vehicle that allows the operator to easily check the vertical position or the angle of the bucket has been desired.

PRIOR ART DOCUMENT

Patent Document 1: JP-A 2006-77473

SUMMARY OF THE INVENTION

An object of the present invention is to provide a work vehicle that allows an operator to easily check the vertical position and the angle of bucket.

The problem to be solved by the invention is as described above, and means for solving the problem will be described below.

According to a first aspect of the present invention, there is provided a work vehicle including a work machine with a bucket, which is configured to freely raise/lower and rotate the bucket, the work vehicle comprising: a display disposed near an operator seat. The display is configured to display vertical position information and angle information of the bucket.

According to a second aspect of the present invention, the display is configured to display the vertical position information synchronized with an upward/downward movement of the bucket, and to display the angle information synchronized with a rotational movement of the bucket.

According to a third aspect of the present invention, the display is configured to display vertical position setting information as an index of the upward/downward movement of the bucket, and to display angle setting information as an index of the rotational movement of the bucket.

According to a fourth aspect of the present invention, the display includes an operation section that allows operation for setting the vertical position setting information and the angle setting information.

According to a fifth aspect of the present invention, the work vehicle further comprises: a control section. The display includes: a display section configured to display in a selectable manner a plurality of the work machines that are attached to and linkable to the work vehicle, and to display in an identifiable manner one of the work machines that is linked to the work vehicle; and an operation section that allows operation for linking the work vehicle to one of the work machines displayed on the display section. The control section cuts a linkage between the work vehicle and one of the work machines that is linked thereto and makes a linkage between the work vehicle and desired one of the work machines when the operation section is operated to link the work vehicle to the desired one of the work machines.

The present invention produces the effects as described below.

According to the first aspect of the present invention, the display is configured to display the vertical position information and the angle information of the bucket. This allows the operator to easily check the vertical position and the angle of the bucket.

According to the second aspect of the present invention, the display is configured to display the vertical position information that is synchronized with the upward/downward movement of the bucket, and to display the angle information that is synchronized with the rotational movement of the bucket. This allows the operator to easily operate the work machine while viewing the screen.

According to the third aspect of the present invention, the display is configured to display the vertical position setting information as an index of the upward/downward movement of the bucket, and to display the angle setting information as an index of the rotational movement of the bucket. This allows the operator to appropriately operate the work machine, since the operator can control the vertical position and the angle of the bucket while checking the indexes.

According to the fourth aspect of the present invention, the operator can easily set the vertical position setting information and the angle setting information while viewing the display.

According to the fifth aspect of the present invention, the work vehicle includes the sections respectively configured to operate and to display the linkage with the work machine. With this configuration, the operator can operate and confirm the settings of the linkage with the work machine while staying in the work vehicle. This allows the operator in the work vehicle to confirm which work machine is linked to the work vehicle and also to perform operation as to which work machine is to be linked to the work vehicle while staying in the work vehicle without moving to the work machine, and thus improving the operation efficiency.

EMBODIMENTS OF THE INVENTION

The technical idea of the present invention can be applied to any kinds of work vehicles. The following description is made by taking an example of a tractor that is a representative work vehicle.

First, a tractor 1 is described below.

Figure 1:
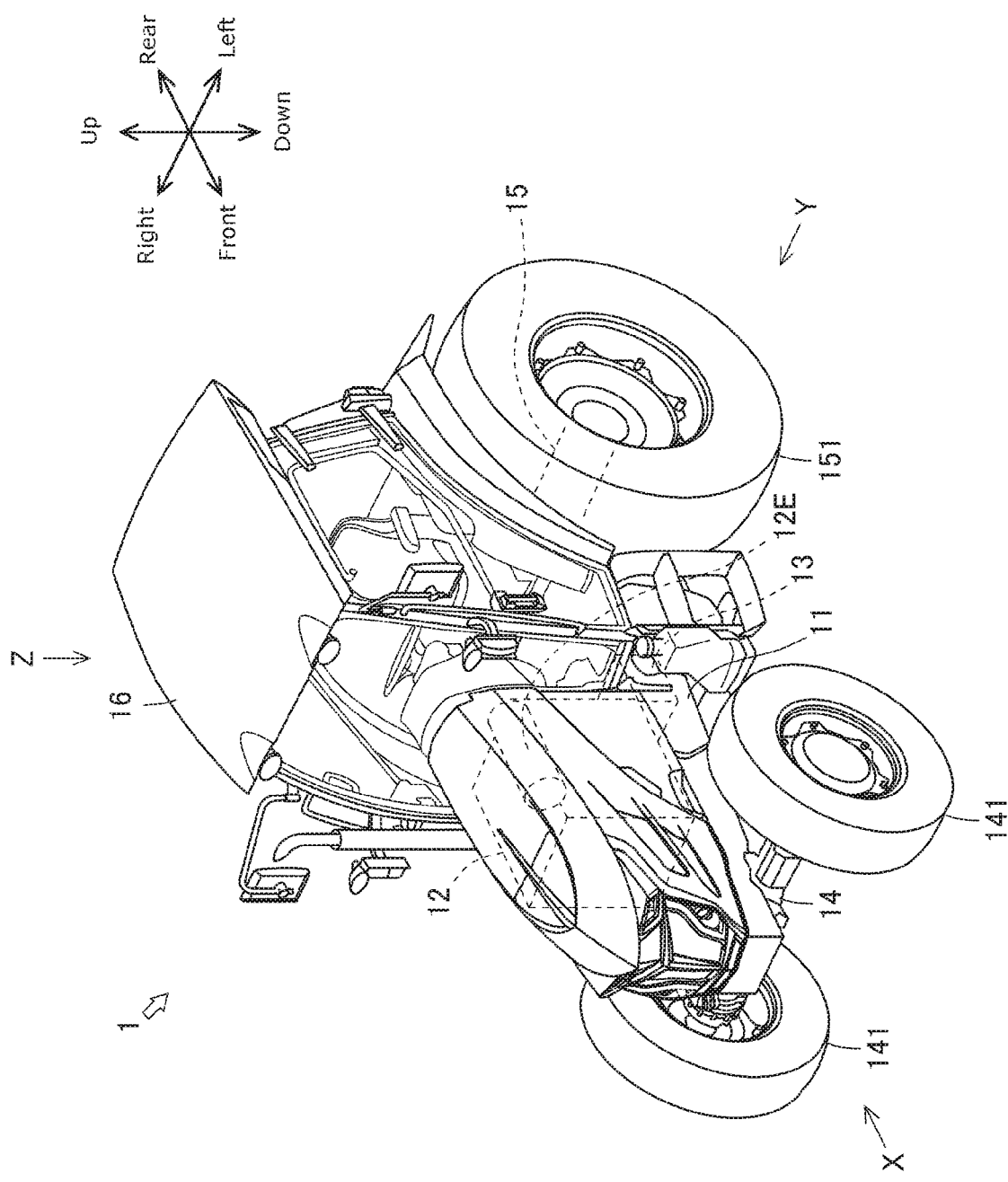
FIG. 1 is an external perspective view of a tractor.
Figure 2:
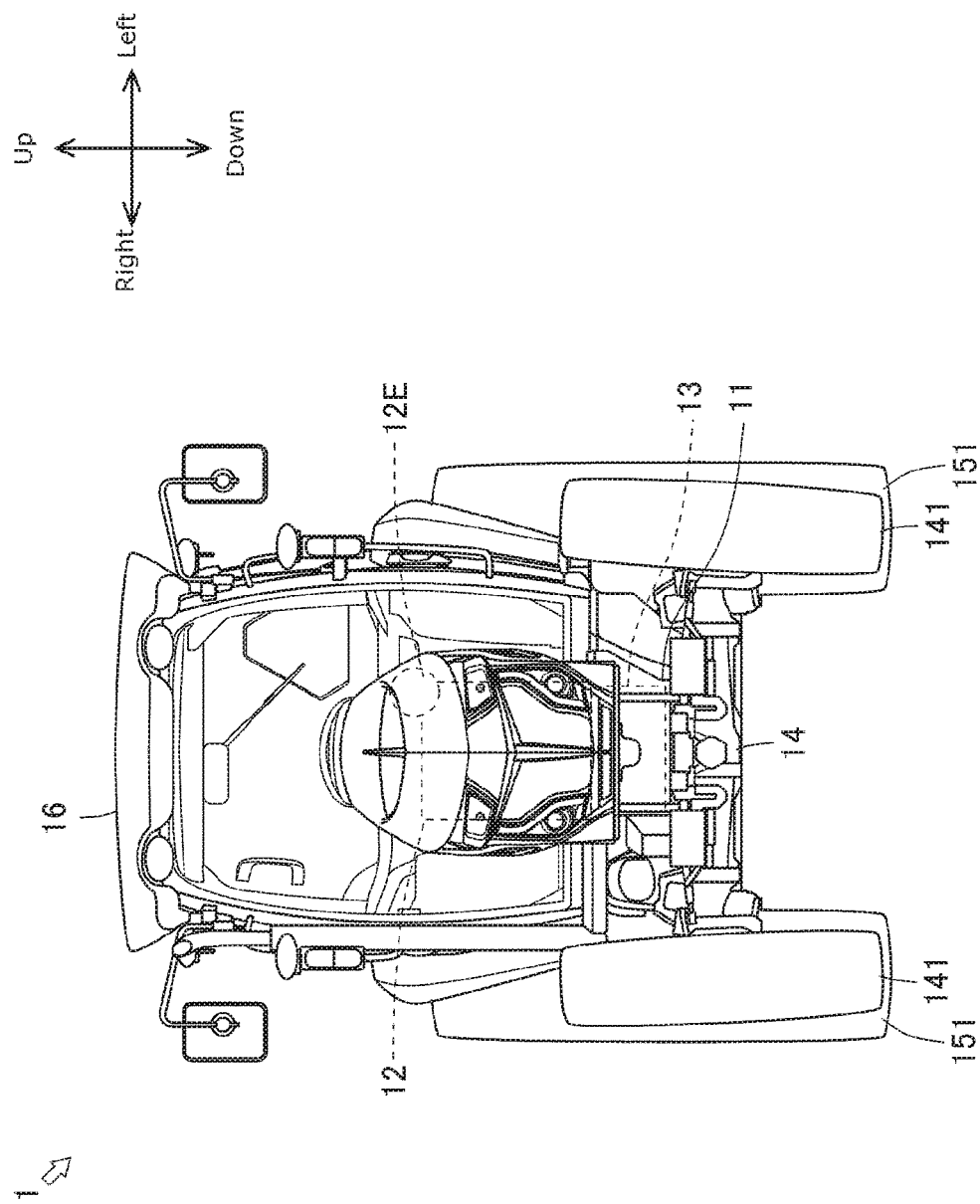
FIG. 2 is a view from the arrow X in FIG. 1.
Figure 3:
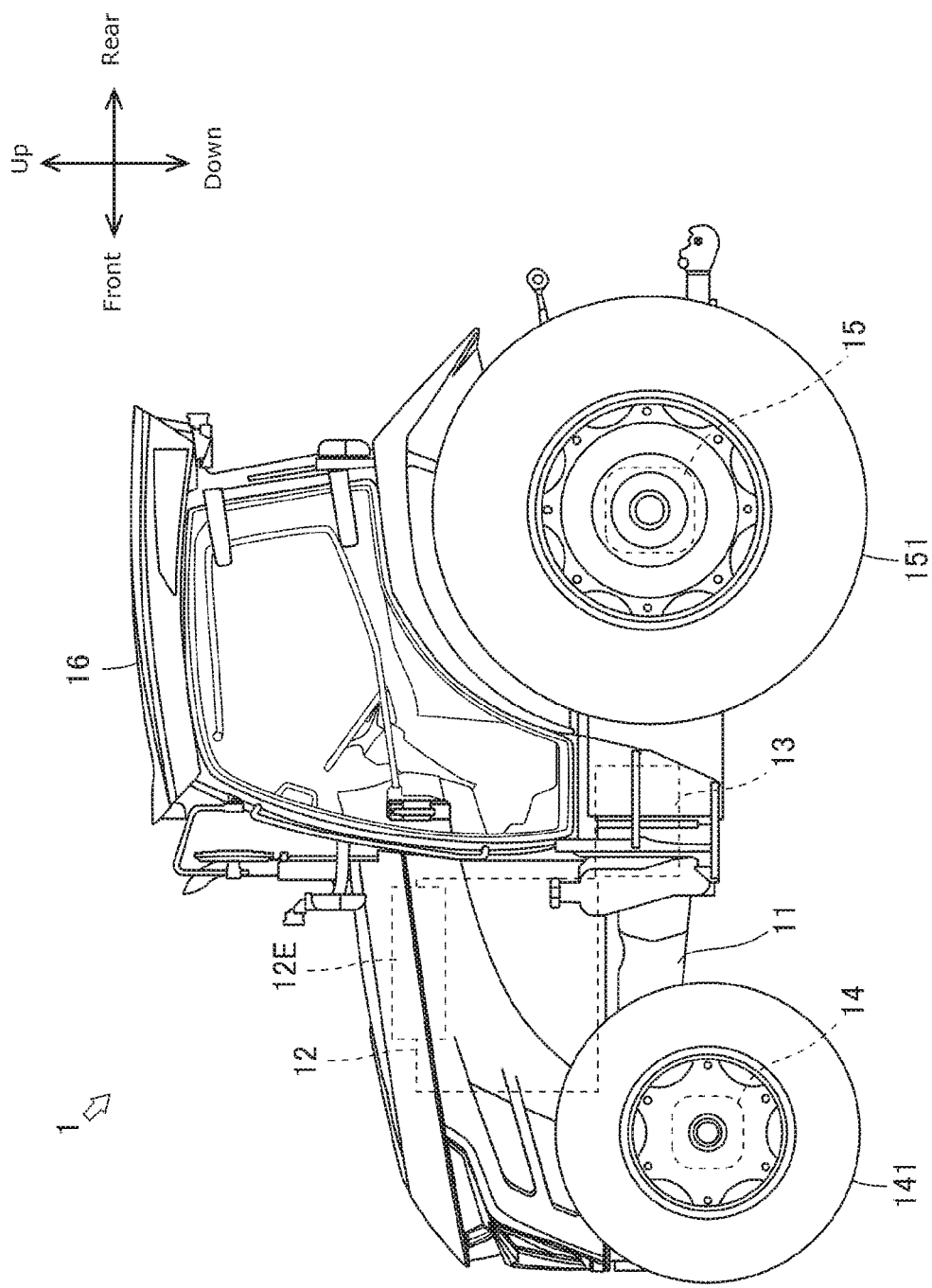
FIG. 3 is a view from the arrow Y in FIG. 1.
Figure 4:
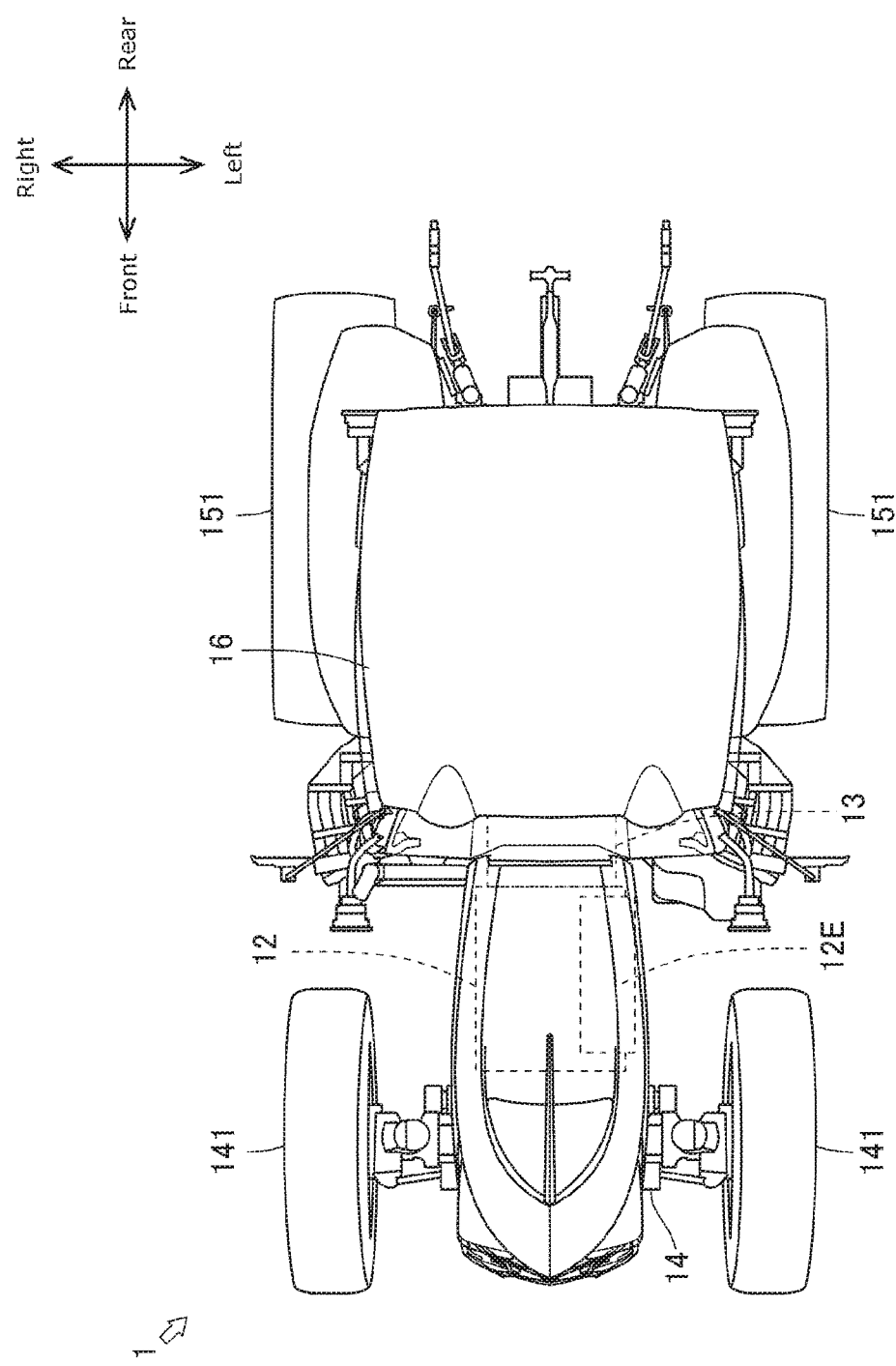
FIG. 4 is a view from the arrow Z in FIG. 1.

FIG. 1 shows the tractor 1. FIG. 2 is a view from the arrow X in FIG. 1, and FIG. 3 is a view from the arrow Y in FIG. 1. FIG. 4 is a view from the arrow Z in FIG. 1. Note that back and front, right and left, and top and bottom of the tractor 1 are indicated in each of the figures.

The tractor 1 mainly includes a frame 11, an engine 12, a transmission 13, a front axle 14, and a rear axle 15. The tractor 1 also includes a cabin 16. The inside of the cabin 16 forms an operation room that includes an operator seat 161, an accelerator pedal 162, a shift lever 163, and the like (see FIG. 7).

The frame 11 provides a skeleton for the front part of the tractor 1. The frame 11 together with the transmission 13 and the rear axle 15 form a chassis of the tractor 1. The engine 12 described below is supported by the frame 11.

The engine 12 converts heat energy obtained by combusting a fuel into kinetic energy. In other words, the engine 12 generates rotational power by combusting a fuel. The engine 12 is connected with an engine control device (not shown). When the operator operates the accelerator pedal 162 (see FIG. 7), the engine control device shifts the operation state of the engine 12 according to the operation by the operator. The engine 12 includes an exhaust emission control device 12E. The exhaust emission control device 12E oxidizes particles, hydrocarbons, carbon monoxide, and the like included in the exhaust gas.

The transmission 13 transmits the rotational power of the engine 12 to the front axle 14 and the rear axle 15. The transmission 13 receives the rotational power from the engine 12 through a connection mechanism. Note that the transmission 13 includes a continuously variable transmission (not shown). When the operator operates the shift lever 163 (see FIG. 7), the continuously variable transmission shifts the operation state of the transmission 13 according to the operation by the operator.

The front axle 14 transmits the rotational power of the engine 12 to front tires 141. The front axle 14 receives the rotational power of the engine 12 through the transmission 13. Note that a steering device (not shown) is provided along with the front axle 14. When the operator operates a steering wheel 164 (see FIG. 7), the steering device changes the steering angles of the front tires 141 according to the operation by the operator.

The rear axle 15 transmits the rotational power of the engine 12 to rear tires 151. The rear axle 15 receives the rotational power of the engine 12 through the transmission 13. Note that a PTO output device (not shown) is provided with the rear axle 15. When the operator operates a PTO switch 165 (see FIG. 7), the PTO output device transmits the rotational power to a hauled work machine according to the operation by the operator.

The tractor 1 is configured in such a manner that the front part thereof can be equipped with a work machine. A front loader 80 which exemplifies the work machine is described below.

Figure 5:
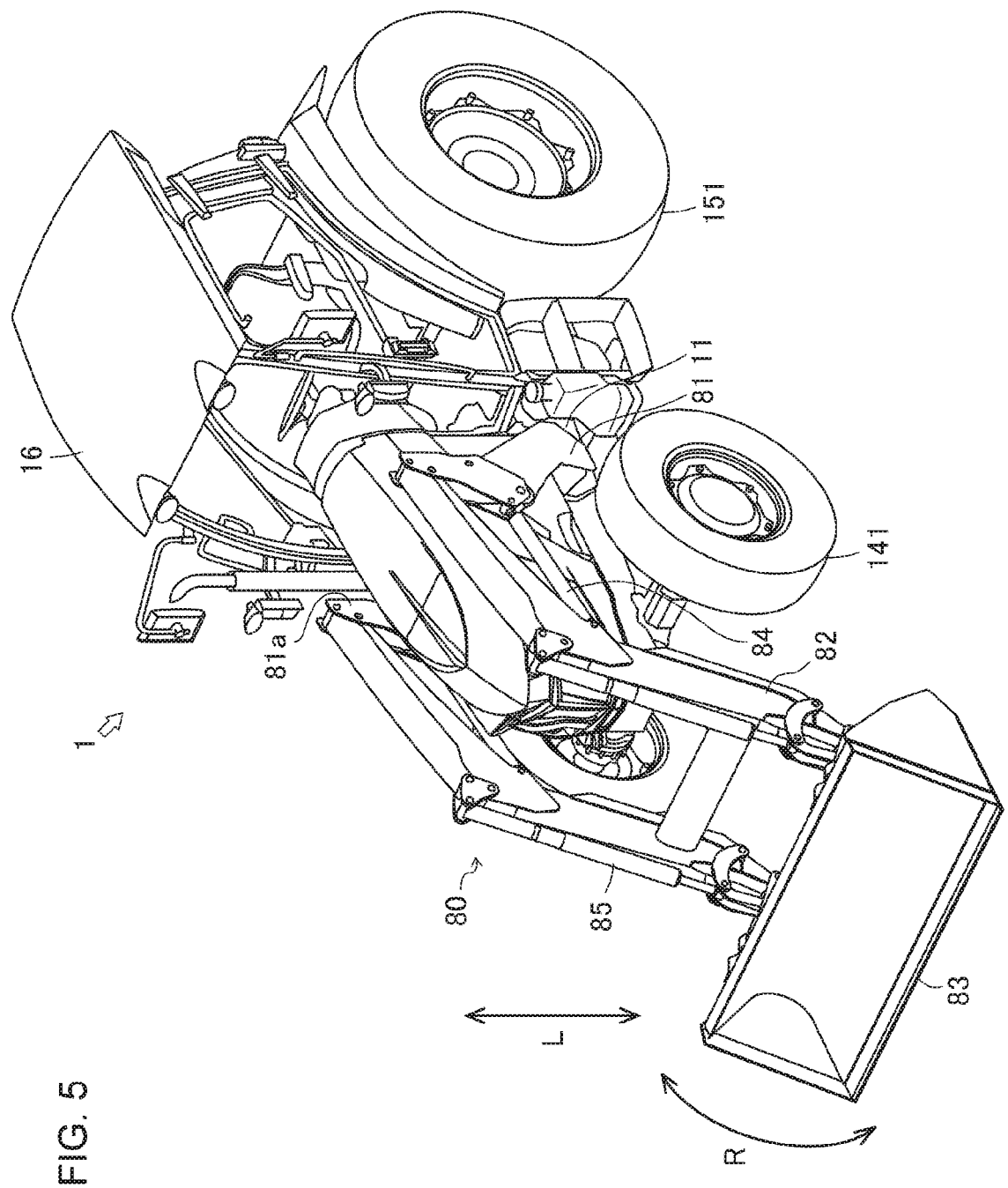
FIG. 5 shows a tractor equipped with a work machine.
Figure 6:
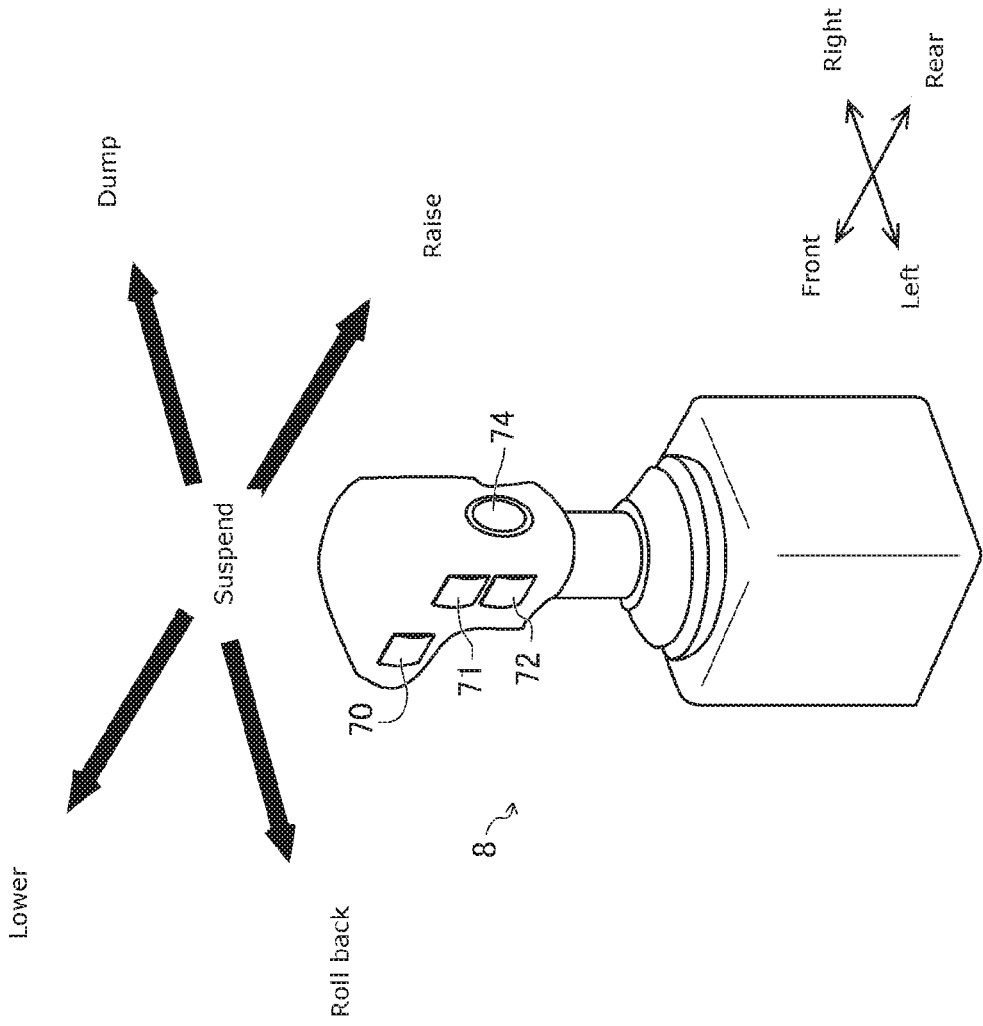
FIG. 6 shows a joystick lever.

FIG. 5 shows the tractor 1 to which the front loader 80 is attached. FIG. 6 shows a joystick lever 8.

The front loader 80 is configured to carry earth and sand. The front loader 80 includes frames 81, arms 82, and a bucket 83.

Each of the frames 81 is fixed to a side surface of the frame 11 with a fixing tool such as a pin. Each of the frames 81 is formed to extend upwardly from the frame 11, and a bracket 81a is attached to an upper end of each of the frames 81.

One end of each of the arms 82 is pivotally supported by the bracket 81a. Each of the arms 82 is rotatable up and down by an extendable lift cylinder 84 (see the arrow L in FIG. 5).

The bucket 83 is rotatably supported by the arms 82. The bucket 83 is rotatable up and down by an extendable rotation cylinder 85 (see the arrow R in FIG. 5).

This configuration enables upward/downward movements and a rotational movement of the bucket 83.

The operator freely raises/lowers and rotates the bucket 83 with the joystick lever 8. When the operator pushes the joystick lever 8 forward or backward, the lift cylinder 84 stretches to turn the arms 82. When the operator pushes the joystick lever 8 leftward or rightward, the rotation cylinder 85 stretches to rotate the bucket 83. Here, a posture in which the end of the bucket 83 is directed upward is defined as a "roll back position". A posture in which the end of the bucket 83 is directed downward is defined as a "dump position". Hereinafter, a direction from the dump position to the roll back position is defined as a direction in which a rotation angle increases, and a direction from the roll back position to the dump position is defined as a direction in which the rotation angle decreases.

The joystick lever 8 is equipped with an automatic standby switch 74, an engine speed acceleration button 70, a maximum traveling speed acceleration button 71, and a maximum traveling speed deceleration button 72.

The operation room of the tractor 1 is described below.

Figure 7:
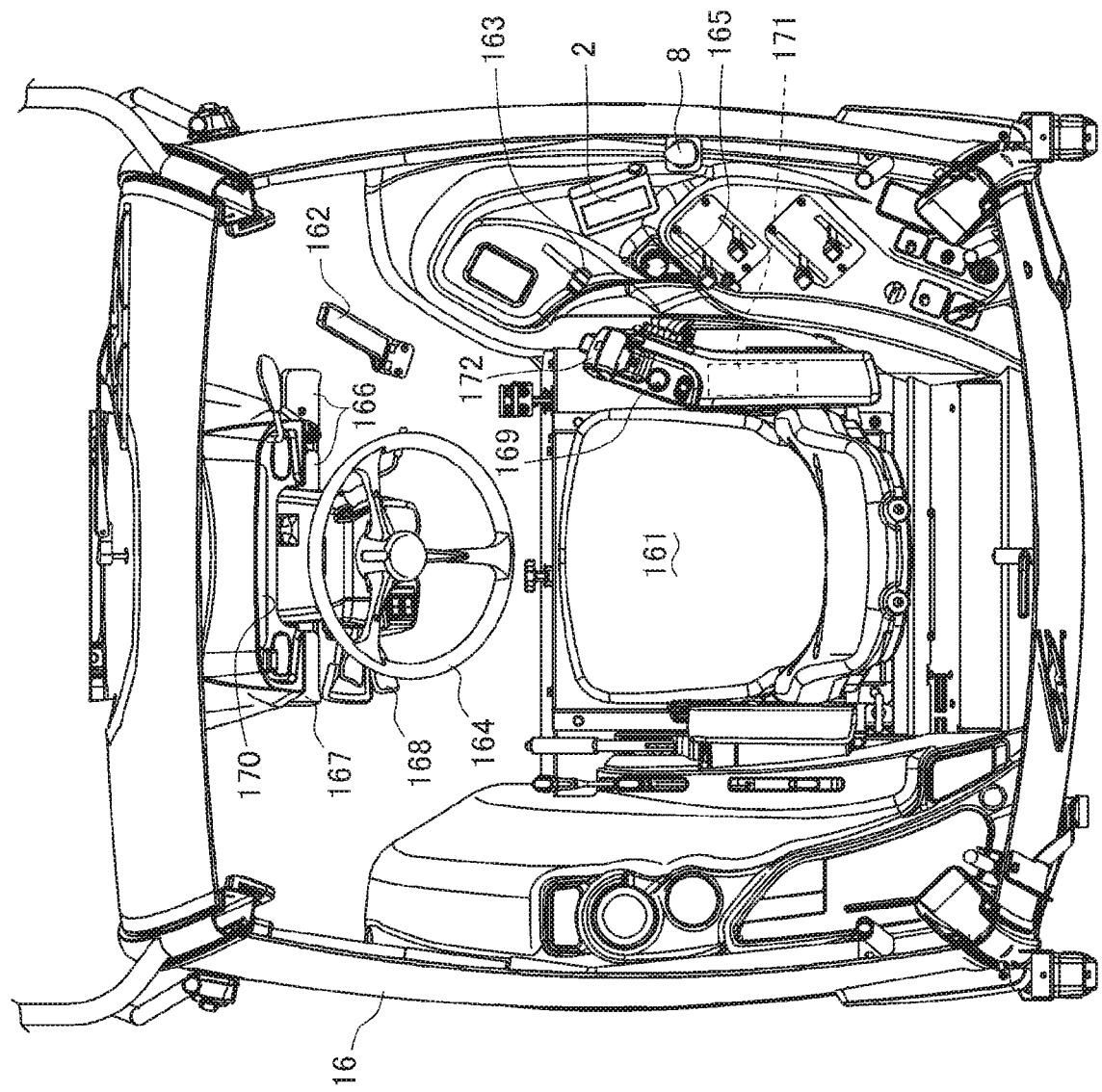
FIG. 7 shows an operator seat of the tractor and surroundings thereof.
Figure 8:
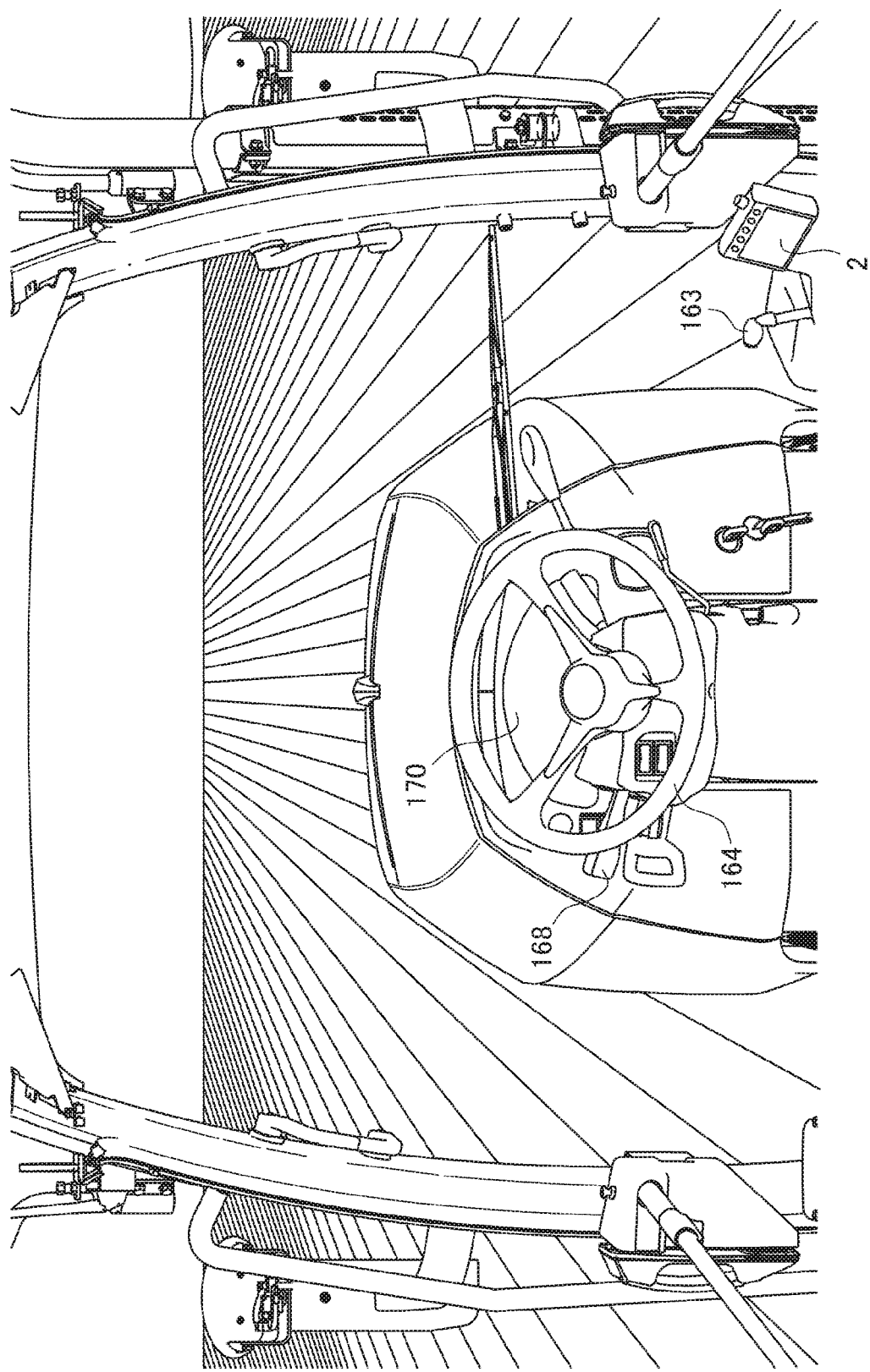
FIG. 8 shows a view of an operator.

FIG. 7 shows the operator seat 161 and the surroundings thereof. FIG. 8 shows a view of the operator.

As described above, the inside of the cabin 16 forms the operation room that includes the operator seat 161, the accelerator pedal 162, the shift lever 163, and the like. A brake pedal 166, a clutch pedal 167, a reverser lever 168, a speed dial 169, an instrument panel 170, and a control panel 171 and the like are provided around the operator seat 161. The operator can control the tractor 1 by operating the accelerator pedal 162, the shift lever 163, and the like while being seated in the operator seat 161.

In addition, the joystick lever 8 is disposed on the right side of the operator seat 161. The operator can control the front loader 80 by operating the joystick lever 8 while being seated in the operator seat 161.

The operator can steplessly change the speed of the traveling speed of the tractor 1 by tilting the shift lever 163.

The instrument panel 170 configured to display various conditions of the tractor 1 such as a current traveling speed is disposed in front of the operator seat 161.

An accelerator lever 172 and the speed dial 169 are disposed in the vicinity of the instrument panel 170. The operator can set the rotation speed of the engine 12 by tilting the accelerator lever 172. The speed dial 169 serves as a maximum rotation speed setting dial that allows the operator to set an upper limit of the rotation speed of the engine 12. In the case where the upper limit of the rotation speed is preset by operation of the speed dial 169, an increase in the rotation speed of the engine 12 automatically stops at the preset rotation speed when the accelerator lever 172 is operated to the fullest extent. In other words, a desired engine speed can be easily obtained and the engine speed can be prevented from exceeding a preset value of the maximum speed by operating the speed dial 169.

Furthermore, the tractor 1 is equipped with a display 2 in the vicinity of the operator seat 161. The display 2 is disposed on the front right side of the operator seat 161 so that the operator can operate the display 2 with the right hand. The display 2 is disposed on a side console. The information network of the tractor 1 is briefly described below, and the display 2 and a control system of the display 2 are also described.

Figure 9:
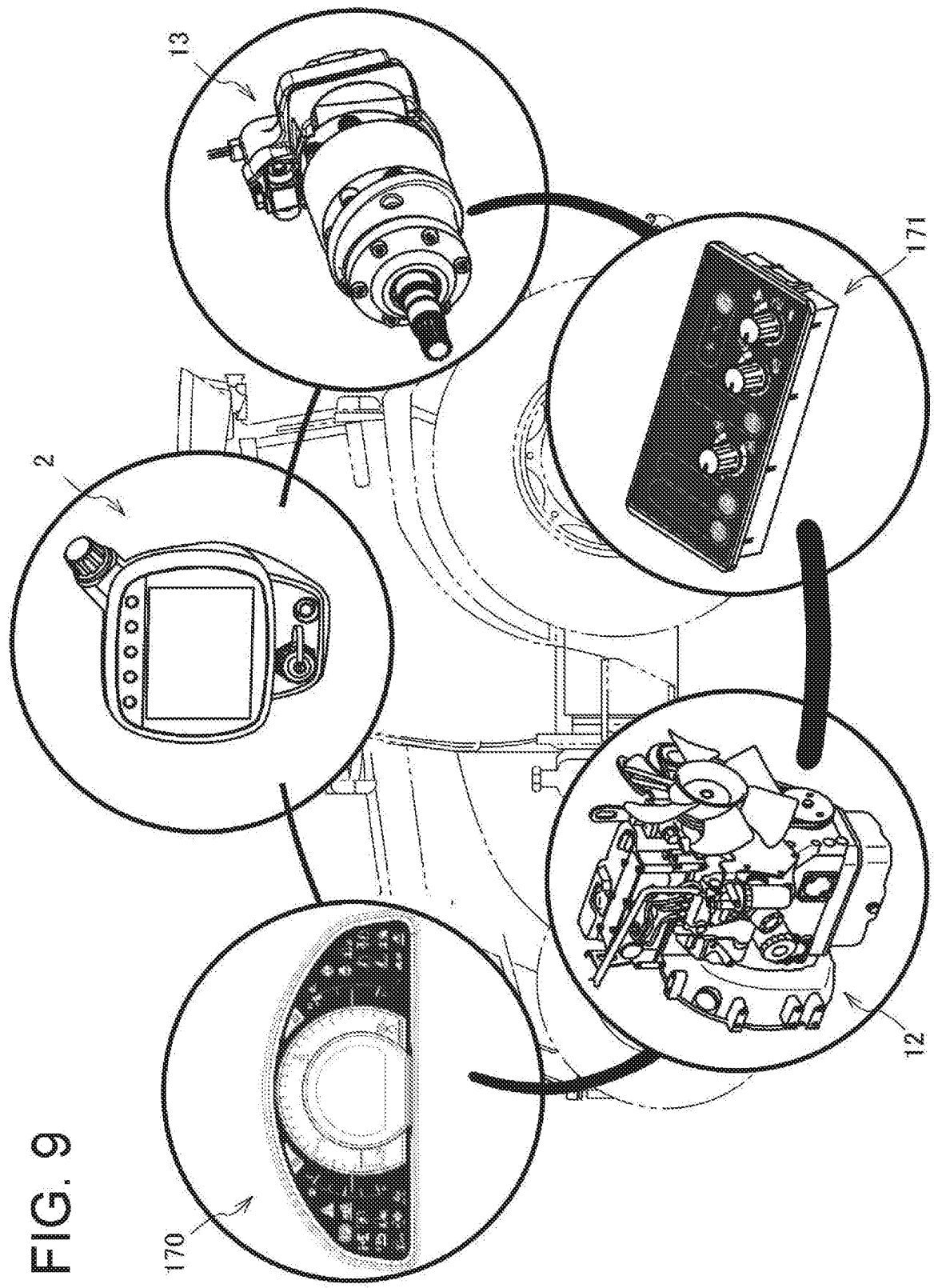
FIG. 9 shows an information network of the tractor.
Figure 10:
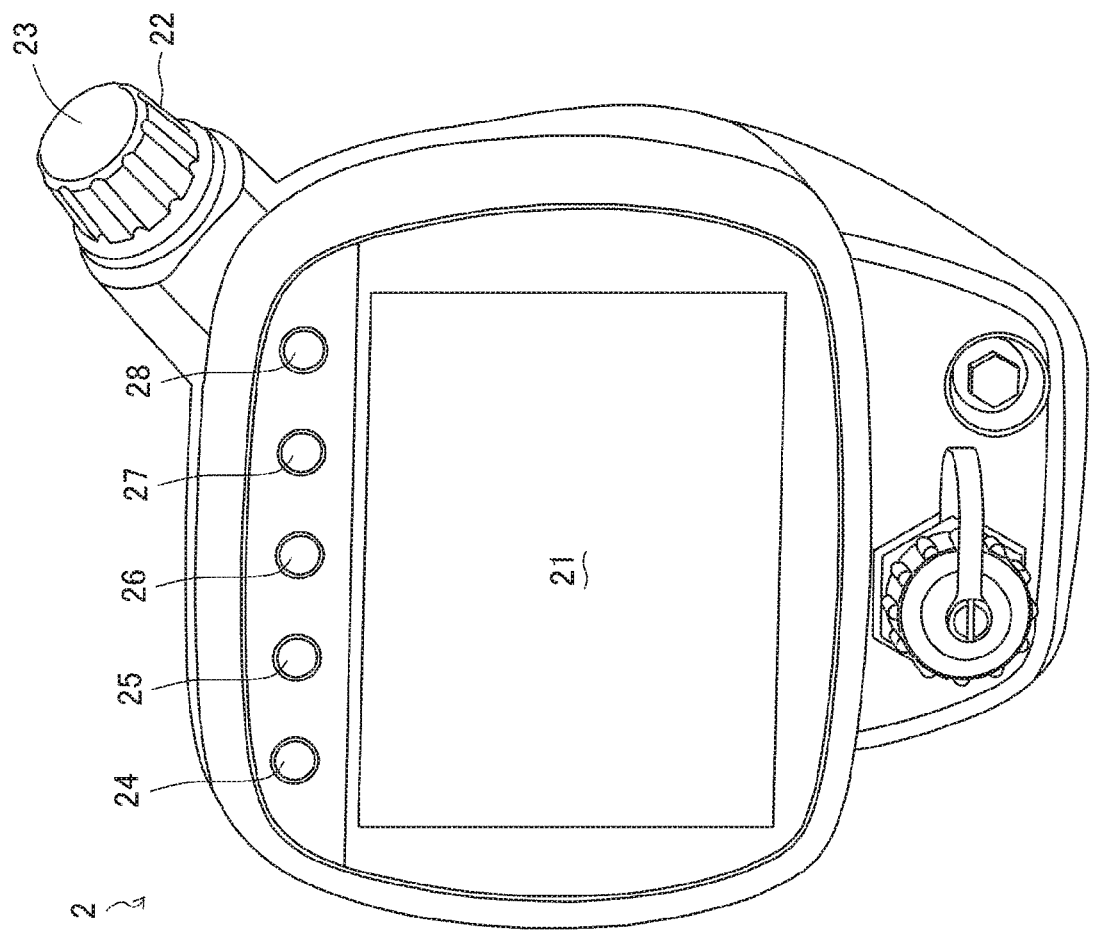
FIG. 10 shows a display.
Figure 11:
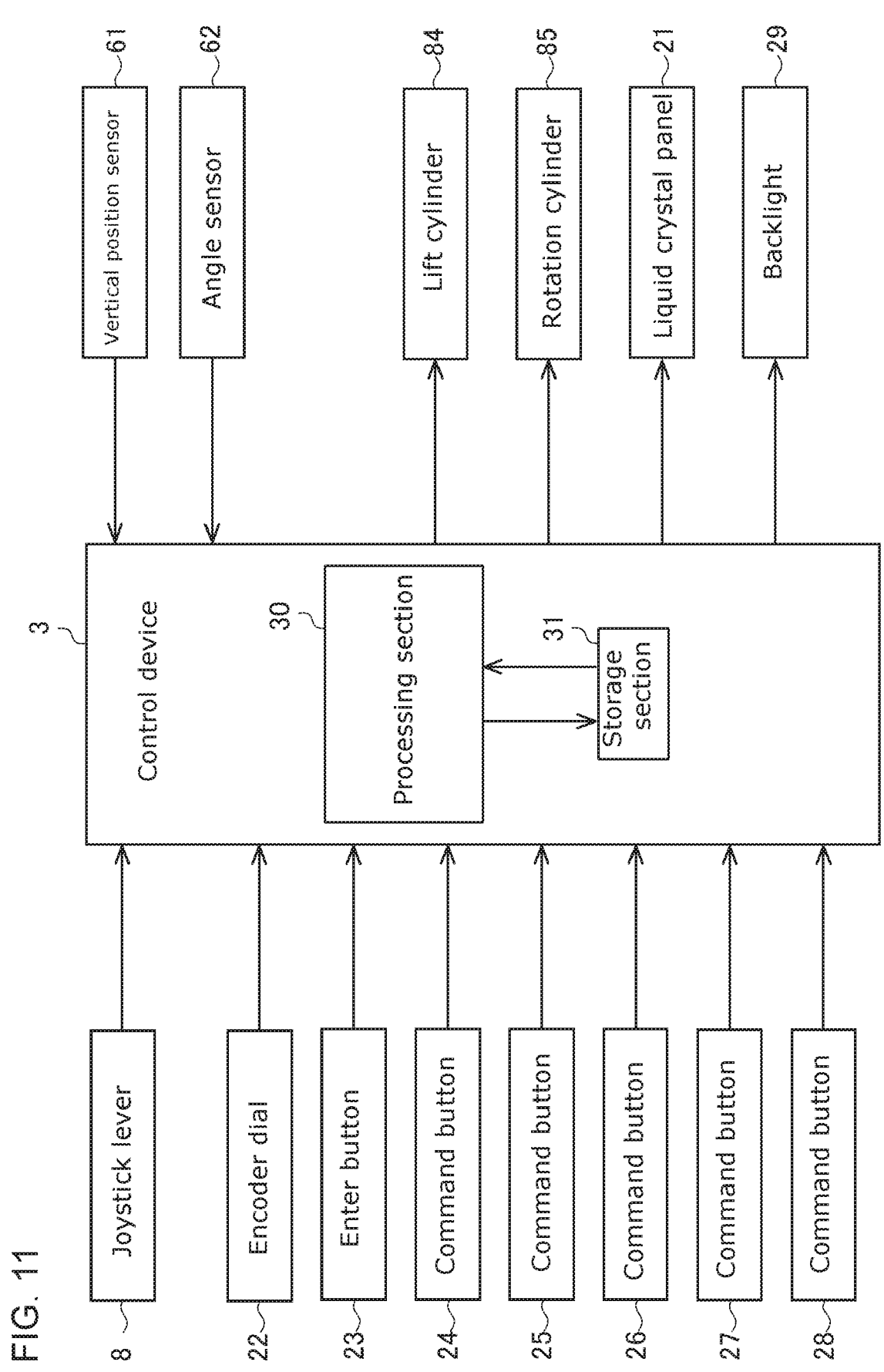
FIG. 11 is a diagram showing a control system relating to the display.

FIG. 9 shows the information network of the tractor 1. FIG. 10 shows the display 2. FIG. 11 shows the control system of the display 2.

The information network is spread widely to each part of the tractor 1 so that the tractor 1 can exhibit maximum performance. Specifically, in addition to the engine 12, the transmission 13, the instrument panel 170, the control panel 171, and the display 2 form a controller area network (CAN) to share information with one another.

In the tractor 1, the display 2 is disposed on the side console (see FIGS. 7 and 8). The display 2 includes a liquid crystal panel 21, an encoder dial 22, and an enter button 23. The display 2 also includes five command buttons 24, 25, 26, 27, 28. Each of the buttons is installed with a backlight 29 using a light emitting diode (LED) or the like as a light source.

The liquid crystal panel 21 is provided at the center of the front face of the display 2. The liquid crystal panel 21 is configured to display a predetermined screen according to an instruction from the control device 3. For example, the liquid crystal panel 21 is configured to display an opening screen 51 according to the instruction from the control device 3 (see FIG. 12). The liquid crystal panel 21 is configured to display other screens according to instructions from the control device 3 (see FIGS. 13 to 16). Note that the liquid crystal panel 21 may be a so-called touch screen.

The encoder dial 22 is provided on the right side of the upper surface of the display 2. The encoder dial 22 is configured to transmit to the control device 3 an operator's intension to scroll a tab or traverse a highlight when an element displayed on the liquid crystal panel 21 is to be selected. For example, the encoder dial 22 is capable of transmitting to the control device 3 an operator's intension to scroll a tab when a displayed number or alphabetical letter is to be selected (see FIG. 13). The encoder dial 22 is also capable of transmitting to the control device 3 an operator's intension to traverse a highlight when a displayed icon is to be selected (see FIGS. 14 and 15).

The enter button 23 is integrated with the encoder dial 22. The enter button 23 is configured to transmit to the control device 3 an operator's decision to select one of the elements displayed on the liquid crystal panel 21. For example, the enter button 23 is capable of transmitting to the control device 3 an operator's decision to select one of the displayed numbers or alphabetical letters (see FIG. 13). The enter button 23 is also capable of transmitting to the control device 3 an operator's decision to select one of the displayed icons (see FIGS. 14 and 15). Note that the display 2 has a configuration in which the enter button 23 is pressed together with the encoder dial 22, but the configuration is not limited thereto. A push button may be provided on the top surface of the encoder dial 22.

The command buttons 24, 25, 26 are provided on an upper part of the front surface of the display 2. When a predetermined screen is displayed on the liquid crystal panel 21, the command buttons 24, 25, 26 are configured to transmit to the control device 3 an operator's intension to switch the screen to another screen. When a home screen S3 is displayed on the liquid crystal panel 21 for example, the command buttons 24, 25 are capable of transmitting an operator's intension to switch the screen to a shortcut screen (i.e., a screen arbitrarily set by the operator) to the control device 3 (see FIG. 14). When another home screen S4 is displayed on the liquid crystal panel 21, the command button 26 is capable of transmitting to the control device 3 an operator's intension to switch the screen to the home screen S3 (see FIG. 15).

The command button 27 is also provided at the upper part of the front surface of the display 2. Specifically, the command button 27 is disposed next to the command button 26. Like the enter button 23, the command button 27 is configured to transmit to the control device 3 an operator's decision to select one of the elements. For example, the command button 27 is capable of transmitting to the control device 3 an operator's decision to select one of the displayed numbers or alphabetical letters (see FIG. 13). The command button 27 is capable of transmitting to the control device 3 an operator's decision to select one of the displayed icons (see FIGS. 14 and 15). In addition, the command button 27 is capable of transmitting to the control device 3 an operator's intension to store the set items (see FIG. 16).

The command button 28 is also provided at the upper part of the front surface of the display 2. Specifically, the command button 28 is disposed next to the command button 27. When a predetermined screen is displayed on the liquid crystal panel 21, the command button 28 is configured to transmit to the control device 3 an operator's intension to return to the previous screen. When the home screen S4 is displayed on the liquid crystal panel 21 for example, the command button 28 is capable of transmitting to the control device 3 an operator's intension to return to the home screen S3 (see FIG. 15). When a loader screen S5 is displayed on the liquid crystal panel 21, the command button 28 is capable of transmitting to the control device 3 an operator's intension to return to the home screen S4 (see FIG. 16).

The control device 3 is connected with a vertical position sensor 61 and an angle sensor 62. The vertical position sensor 61 detects the vertical position of the bucket 83. The angle sensor 62 detects the rotation angle of the bucket 83. Detection signals from the sensors are transmitted to the control device 3.

In the tractor 1, the lift cylinder 84 and the rotation cylinder 85 operate according to the operation of the joystick lever 8. The vertical position of the bucket 83 changes according to the operation of the lift cylinder 84, and the rotation angle of the bucket 83 changes according to the operation of the rotation cylinder 85. The lift cylinder 84 and the rotation cylinder 85 operate according to the control by the control device 3. The lift cylinder 84 and the rotation cylinder 85 are connected to a hydraulic circuit having a flow-path switching valve (not shown). The hydraulic circuit is connected with a pump (not shown) that operates by the rotational power of the engine 12.

A storage section 31 includes a non-rewritable memory such as a random access read only memory (ROM), a volatile memory such as a random access memory (RAM), a hard disk drive, a flash memory, and the like. The storage section 31 stores information such as a program and a map. A processing section 30 is configured to implement the program or the like stored in the ROM after reading it out onto the RAM.

The processing section 30 recognizes the detected vertical position and rotation angle. Based on the these information and the information stored in the storage section 31, the processing section 30 calculates a required amount of operation of the lift cylinder 84 and a required amount of operation of the rotation cylinder 85.

Based on the results of the calculation, the control device 3 controls the lift cylinder 84 and the rotation cylinder 85. Specifically, the control device 3 controls the opening/closing of the flow-path switching valve (not shown) according to the amount of operation of the joystick lever 8. Then, the amount of operation of the lift cylinder 84 and the amount of operation of the rotation cylinder 85 are adjusted according to the degree of opening of the flow-path switching valve.

An operation method to set the vertical position setting information as an index of the upward/downward movement of the bucket 83 and the angle setting information as an index of the rotation operation of the bucket 83 is described below.

FIGS. 12 to 16 each show a screen to be displayed on the display 2. Note that each of the figures schematically shows only necessary parts for describing the present invention.

Figure 12:
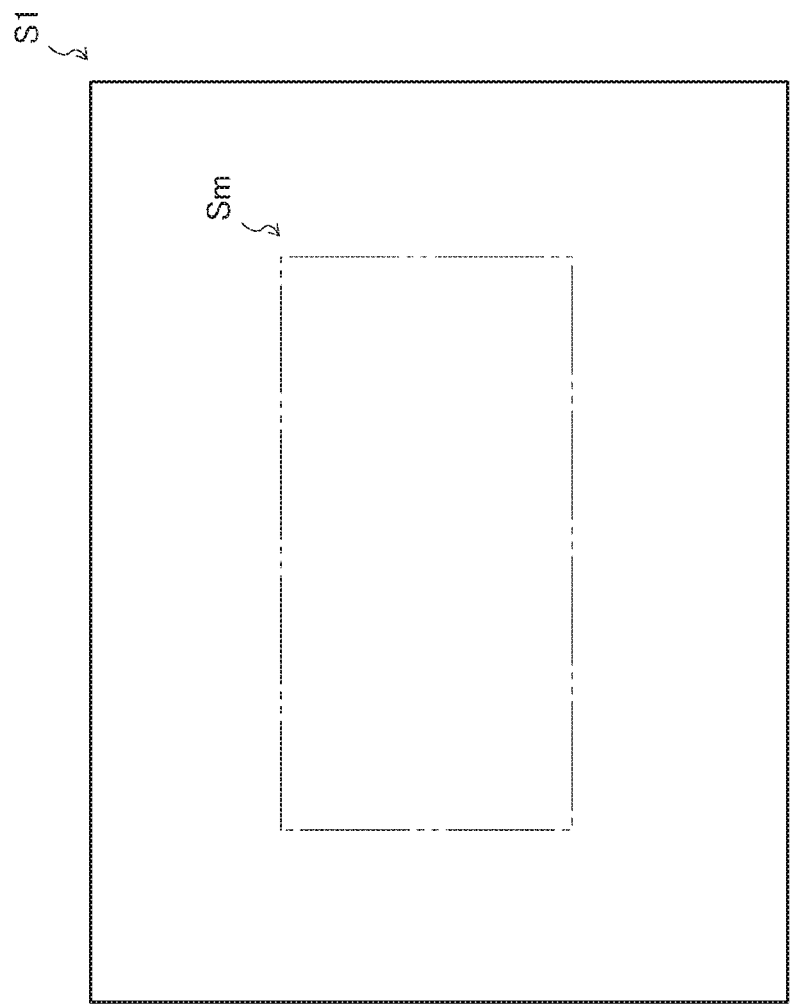
FIG. 12 shows a screen displayed on the display.

First, the opening screen 51 is displayed on the display 2 (see FIG. 12). A symbol mark Sm is displayed at the center of the opening screen 51. The symbol mark Sm is a design for symbolizing a supplier manufacturing company. The symbol mark Sm emerges out onto a black colored background image to make a strong impression on the operator.

Figure 13:
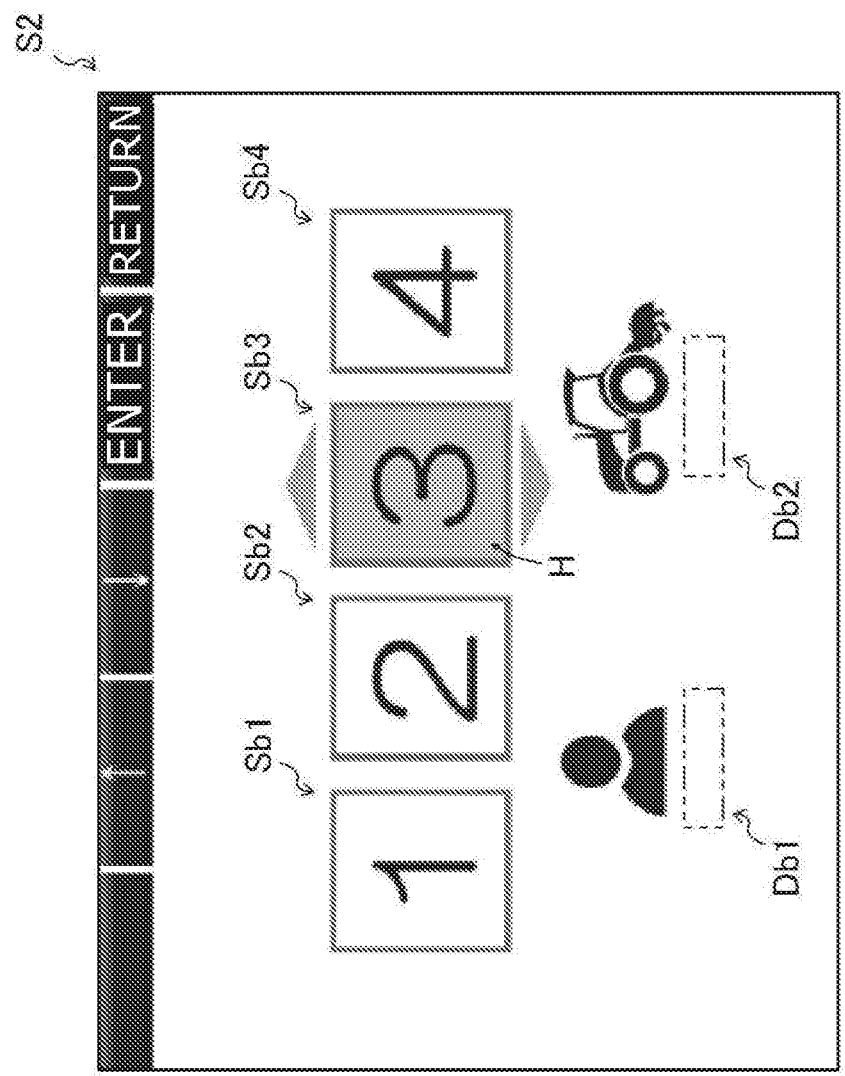
FIG. 13 shows a screen displayed on the display.

Subsequently, a lock release screen S2 is displayed on the display 2 (see FIG. 13). On the lock release screen S2, scroll boxes Sb1, Sb2, Sb3, Sb4 are aligned in a row for inputting a personal identification number. One of the scroll boxes Sb1, Sb2, Sb3, Sb4, which has been selected, is highlighted (see "H" in FIG. 13). Each of the scroll boxes Sb1, Sb2, Sb3, Sb4 is capable of scroll-displaying numbers from 0 to 9 or alphabetical letters from A to F. The operator can select one of the numbers or the alphabetical letters by turning the encoder dial 22, and enter the selected number or alphabetical letter by pressing the enter button 23.

Note that on the lock release screen S2, the operator can select one of the numbers or the alphabetical letters by pressing the command button 25 or 26, and enter the selected number or alphabetical letter by pressing the command button 27. The operator can cancel the entry by pressing the command button 28. When the input personal identification number is incorrect, a message to that effect is displayed. On the lock release screen S2, a dialog box Db1 showing the name of the operator and a dialog box Db2 showing a work schedule are displayed. These dialog boxes Db1, Db2 allow the operator to grasp the work schedule.

Figure 14:
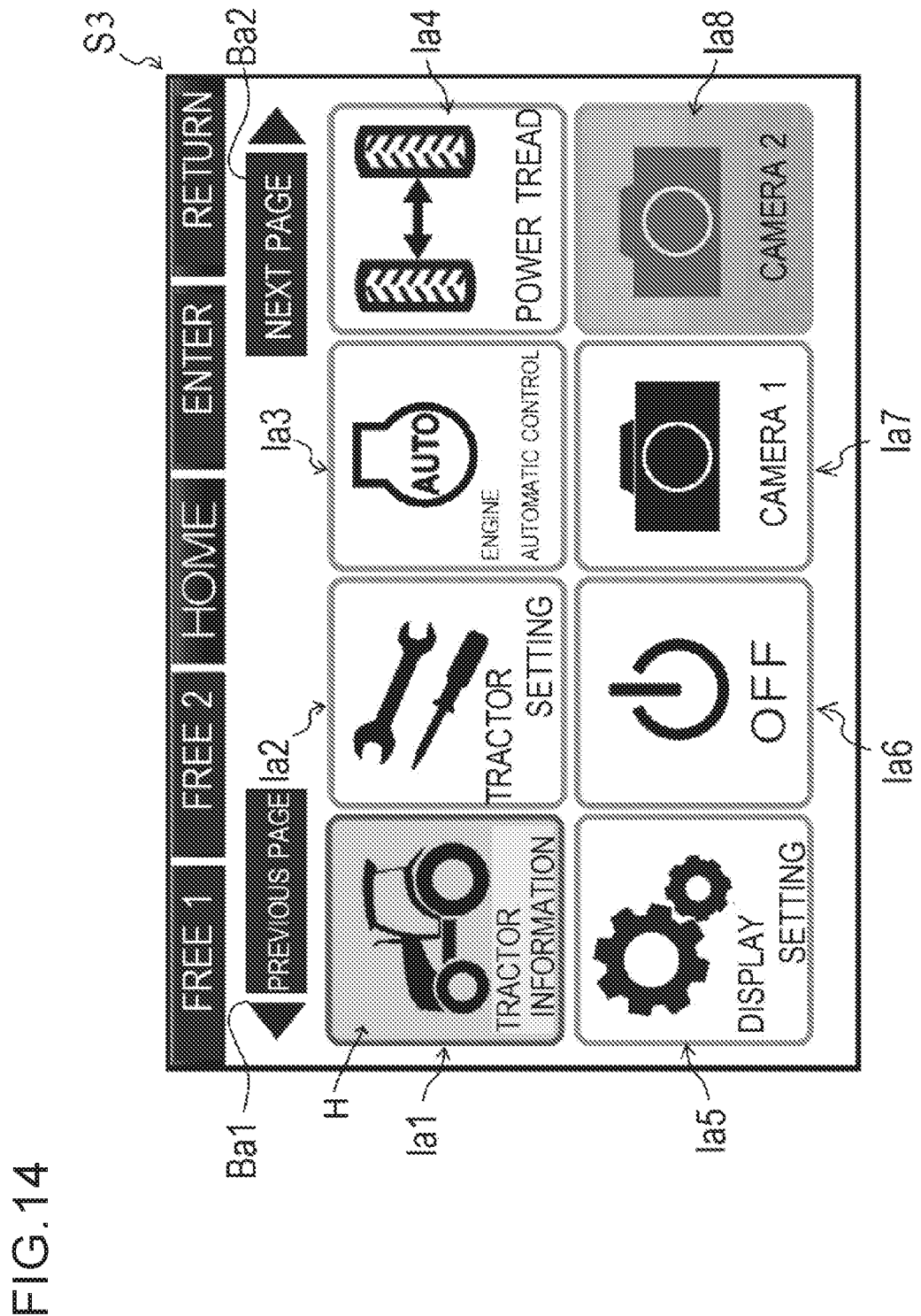
FIG. 14 shows a screen displayed on the display.

Then, the display 2 displays the home screen S3 (see FIG. 14). On the home screen S3, icons Ia1, Ia2, Ia3, Ia4, . . . , Ia8 are arranged in upper and lower two rows for selecting a menu. One of the icons Ia1, Ia2, Ia3, Ia4, . . . , Ia8, which has been selected, is highlighted (see "H" in the FIG. 14). The icons Ia1, Ia2, Ia3, Ia4, . . . , Ia8 are sequentially highlighted according to the rotation of the encoder dial 22. The operator can select a desired icon (any one of the icons Ia1, Ia2, Ia3, Ia4, . . . , Ia8) by turning the encoder dial 22, and enter the selection of the icon by pressing the enter button 23.

Note that on the home screen S3, an icon (any one of the icons Ia1, Ia2, Ia3, Ia4, . . . , Ia8) cannot be selected by pressing a command button (any one of the command buttons 24, 25, 26, 27, 28), but the selection of the icon can be entered by pressing the command button 27. The display returns to the lock release screen S2 by pressing the command button 28. In addition, when a button Ba1 marked as "previous page" or a button Ba2 marked as "next page" is selected and entered, another home screen S4 is displayed. The icon that cannot be selected is displayed in a grayed-out state (see "G" in FIG. 14).

Here, the button Ba2 marked as "next page" is selected and entered.

Figure 15:
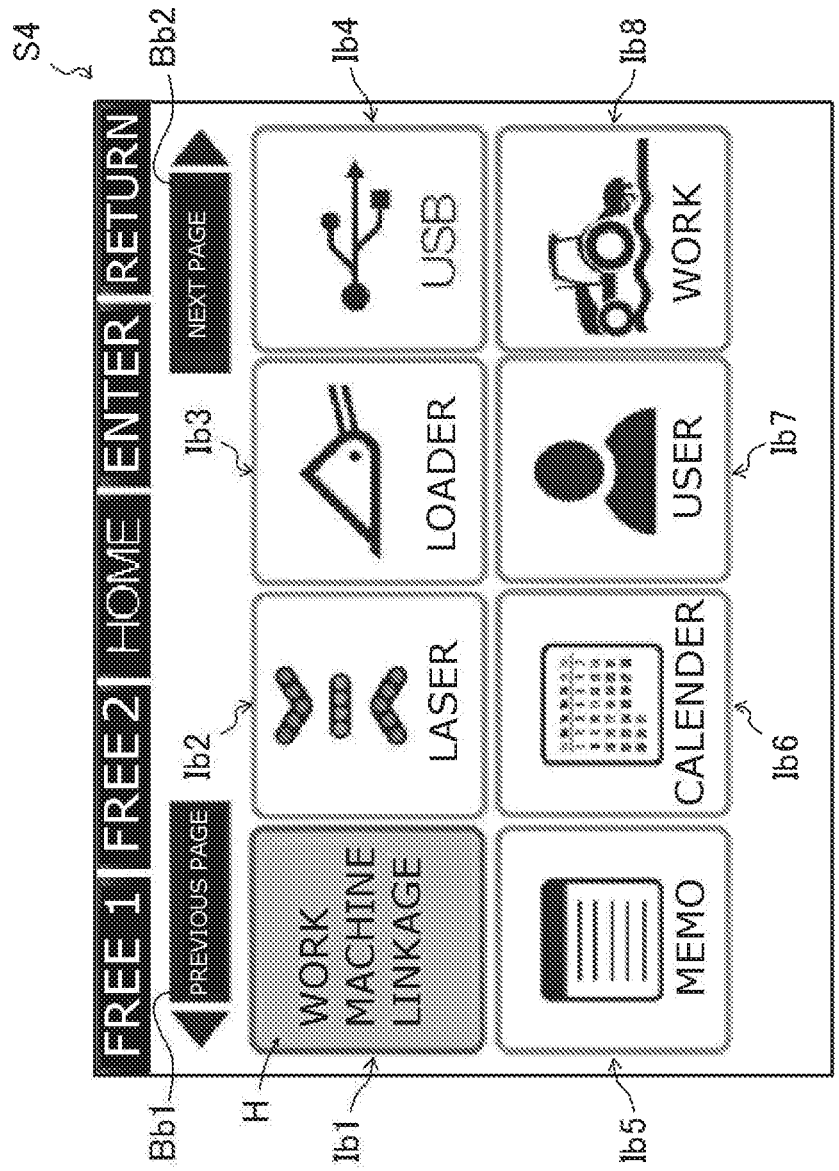
FIG. 15 shows a screen displayed on the display.

The display 2 displays the other home screen S4 (see FIG. 15). On the home screen S4, icons Ib1, Ib2, Ib3, Ib4, . . . , Ib8 are arranged in upper and lower two rows for selecting a menu. One of the icons Ib1, Ib2, Ib3, Ib4, . . . , Ib8, which has been selected, is highlighted (see "H" in FIG. 15). The icons Ib1, Ib2, Ib3, Ib4, . . . , Ib8 are sequentially highlighted according to the rotation of the encoder dial 22. The operator can select a desired icon (any one of the icons Ib1, Ib2, Ib3, Ib4, . . . , Ib8) by turning the encoder dial 22, and enter the selection of the icon by pressing the enter button 23.

Note that on the home screen S4, an icon (any one of the icons Ib1, Ib2, Ib3, Ib4, . . . , Ib8) cannot be selected by pressing a command button (any one of the command buttons 24, 25, 26, 27, 28), but the selection of the icon can be entered by pressing the command button 27. The display returns to the home screen S3 by pressing the command button 28. In addition, when a button Bb1 marked as "previous page" or a button Bb2 marked as "next page" is selected and entered, the home screen S3 is displayed. The icon that cannot be selected is displayed in a grayed-out state (not shown).

Here, the icon Ib3 marked as "loader" is selected and entered.

Figure 16:
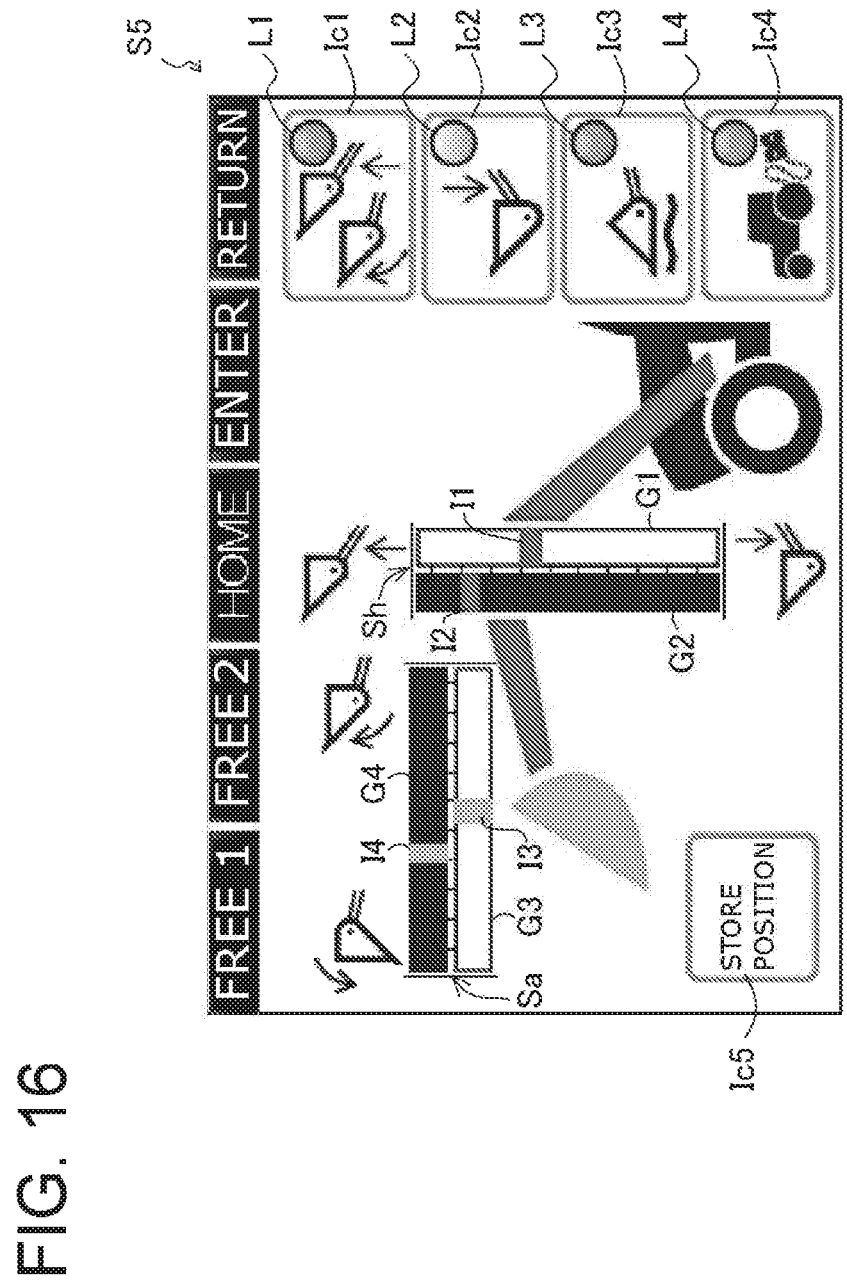
FIG. 16 shows a screen displayed on the display.

The display 2 displays a loader screen S5 (see FIG. 16). The loader screen S5 is a screen in which the vertical position information and the angle information of the bucket are displayed. On the loader screen S5, a ruler Sh and a ruler Sa are displayed. On the loader screen S5, graphs G1, G2, G3, G4 and icons Ic1, Ic2, Ic3, Ic4, Ic5 are also displayed. The operator can select a desired icon from the icons Ic1 to Ic5 by turning the encoder dial 22, and enter the selection of the icon by pressing the enter button 23 or the command button 27.

The ruler Sh and the graphs G1, G2 indicate the vertical position information of the bucket 83. The ruler Sh and the graphs G1, G2 are vertically displayed on the loader screen S5. The ruler Sh is displayed between the graph G1 and the graph G2.

The ruler Sa and the graphs G3, G4 indicate the angle information of the bucket 83. The ruler Sa and the graphs G3, G4 are laterally displayed on the loader screen S5. The ruler Sa is displayed between the graph G3 and the graph G4.

The graphs G1, G2, G3, G4 are so-called bar graphs. The graphs G1 and G3 are displayed in white. The graphs G2 and G4 are displayed in black. The graphs G1, G2, G3, G4 respectively include indicators I1, I2, I3, I4. The indicators I1, I2, I3, I4 move along the respective graphs G1 G2, G3, G4. Note that the indicators I1, I2 are displayed in red. The indicators I3, I4 are displayed in blue.

The ruler Sh indicates a range of the upward/downward movement of the bucket 83. The range indicated by the ruler Sh is a mechanically limited range of the upward/downward movement of the bucket 83. In other words, the ruler Sh indicates a movable range in the vertical direction of the bucket 83. The upper end of each of the graphs G1, G2 is an upper limit of the movable range, and the lower end of each of the graphs G1, G2 is a lower limit of the movable range. Note that the range indicated by the ruler Sh may be a limited range in a controlled manner.

The ruler Sa indicates a range of the rotation angle of the bucket 83. The range indicated by the ruler Sa is a mechanically limited range of the rotational movement of the bucket 83. In other words, the ruler Sa indicates a rotatable range of the bucket 83. The right end of each of the graphs G3, G4 is the upper limit of the rotatable range, and the left end of each of the graphs G3, G4 is the lower limit of the rotatable range. Note that the range indicated by the ruler Sa may be a limited range in a controlled manner.

The graph G1 indicates an actual vertical position of the working bucket 83. The whole length of the graph G1 is equally divided into ten with respect to the movable range of the bucket 83 in the vertical direction. The indicator I1 moves along the graph G1 in synchronization with the upward/downward movement of the bucket 83. The indicator I1 moves upward when the vertical position of the bucket 83 is raised, and the indicator I1 moves downward when the vertical position of the bucket 83 is lowered.

On the other hand, the graph G3 indicates an actual angle of the rotating bucket 83. The whole length of the graph G3 is equally divided into ten with respect to the rotatable range of the bucket 83. The indicator I3 moves laterally along the graph G3 in synchronization with the rotation of the bucket 83. The indicator I3 moves rightward when the rotation angle of the bucket 83 increases, and the indicator I3 moves leftward when the rotation angle of the bucket 83 decreases.

In this manner, the display 2 displays the vertical position information in synchronization with the upward/downward movement of the bucket 83, and displays the angle information in synchronization with the rotational movement of the bucket 83. This allows the operator to easily control the front loader 80 while viewing the screen.

The graph G2 displays the vertical position setting information. The indicator I2 of the graph G2 indicates a vertical position as an index of the upward/downward movement of the bucket 83. The graph G4 indicates the angle setting information. The indicator I4 of the graph G4 indicates a rotation angle as an index of the rotational movement of the bucket 83.

The operator can set the position of the indicator I2 of the graph G2 as an index of the vertical position of the bucket 83. Note that the movement of the bucket 83 is not limited in a range of the index of the vertical position, and the bucket 83 can move beyond the range of the index.

The operator can set the position of the indicator I4 of the graph G4 as an index of the rotation angle of the bucket 83. Note that the movement of the bucket 83 is not limited in a range of the index of the rotation angle, and the bucket 83 can move beyond the range of the index.

The icon Ic5 is used for setting an index of the vertical position and an index of the rotation angle of the bucket 83. In the case where the icon Ic5 is selected and entered while the front loader 80 is under operation, a position detected as an actual vertical position of the bucket 83 is set as an index of the vertical position. At the same time, an angle detected as an actual rotation angle of the bucket 83 is set as an index of the rotation angle. At this time, the indicators I1 and I2 are aligned laterally, and the indicators I3 and I4 are aligned vertically.

The actual vertical position of the bucket 83 is indicated by the indicator I1 of the graph G1. Accordingly, the operator can easily determine whether the vertical position of the bucket 83 is appropriate by comparing the indicator I1 of the graph G1 and the indicator I2 of the graph G2.

The actual rotation range of the bucket 83 is indicated by the indicator I3 of the graph G3. Accordingly, the operator can easily determine whether the angle of the bucket 83 would be appropriate by comparing the indicator I3 of the graph G3 and the indicator I4 of the graph G4.

The operator can set these indexes on the basis of a view from the operator seat 161 while actually operating the front loader 80, for example. Setting these indexes allows the operator to check via the display 2 whether the vertical position and the rotation angle of the bucket 83 are appropriate. Accordingly, efficiency and safety of the operation using the front loader 80 can be improved.

Note that on the loader screen S5, an icon (any one of Ic1, Ic2, Ic3, Ic4) cannot be selected by pressing a command button (any one of 24, 25, 26, 27, 28), but the selection of the icon can be entered by pressing the command button 27. When the command button 28 is pressed, the screen returns to the home screen S4.

Note that the icons Ic1 to Ic4 are icons for switching the control state of the front loader 80. When the icon Ic1 is selected and entered, whether the engine speed is to be changed or to be unchanged can be set. When the icon Ic2 is selected and entered, a limit of the working range can be set and also a predetermined range of the vertical position and a predetermined range of the rotation angle can be set. When the icon Ic3 is selected and entered, a vertical position and a rotation angle of the bucket 83 for storage can be set. When the icon Ic4 is selected and entered, a link between the front loader 80 or another work machine and the tractor 1 can be set.

Some kinds of work machines can be linked to the tractor 1. In addition to the above described front loader 80, a rotary, a sprayer, a broadcaster and the like that are to be attached to the rear part of the tractor 1 are included in the work machines that can be linked to the tractor 1. When such a work machine is attached to the tractor 1, the tractor 1 and the work machine can be linked to each other. The term "link" used herein refers to a state in which the tractor 1 works optimally in accordance with the movements of the work machine. The term "link" also refers to a state in which the work machine works optimally in accordance with a state of the tractor 1. A control system that enables such a linked state is called EcoTra-Link (hereinafter referred to as a work machine link system).

Further, the icons Ic1, Ic2, Ic3, Ic4 respectively include lamps L1, L2, L3, L4. The lamps are configured to indicate the ON or OFF of the respective settings relating to the control of the front loader 80. For example, when the control to automatically increase the engine speed during the operation of the bucket 83 is effective, the lamp L1 is highlighted in green.

In addition, when the bucket 83 moves beyond the set index of the vertical position or the rotation angle, a warning may be issued. For example, the display 2 may have a sound output function and output an alarm sound. When the bucket 83 moves beyond the set vertical position or rotation angle, the display 2 may display the graph G1 or G3 in a color different from the normal color.

Figure 17:
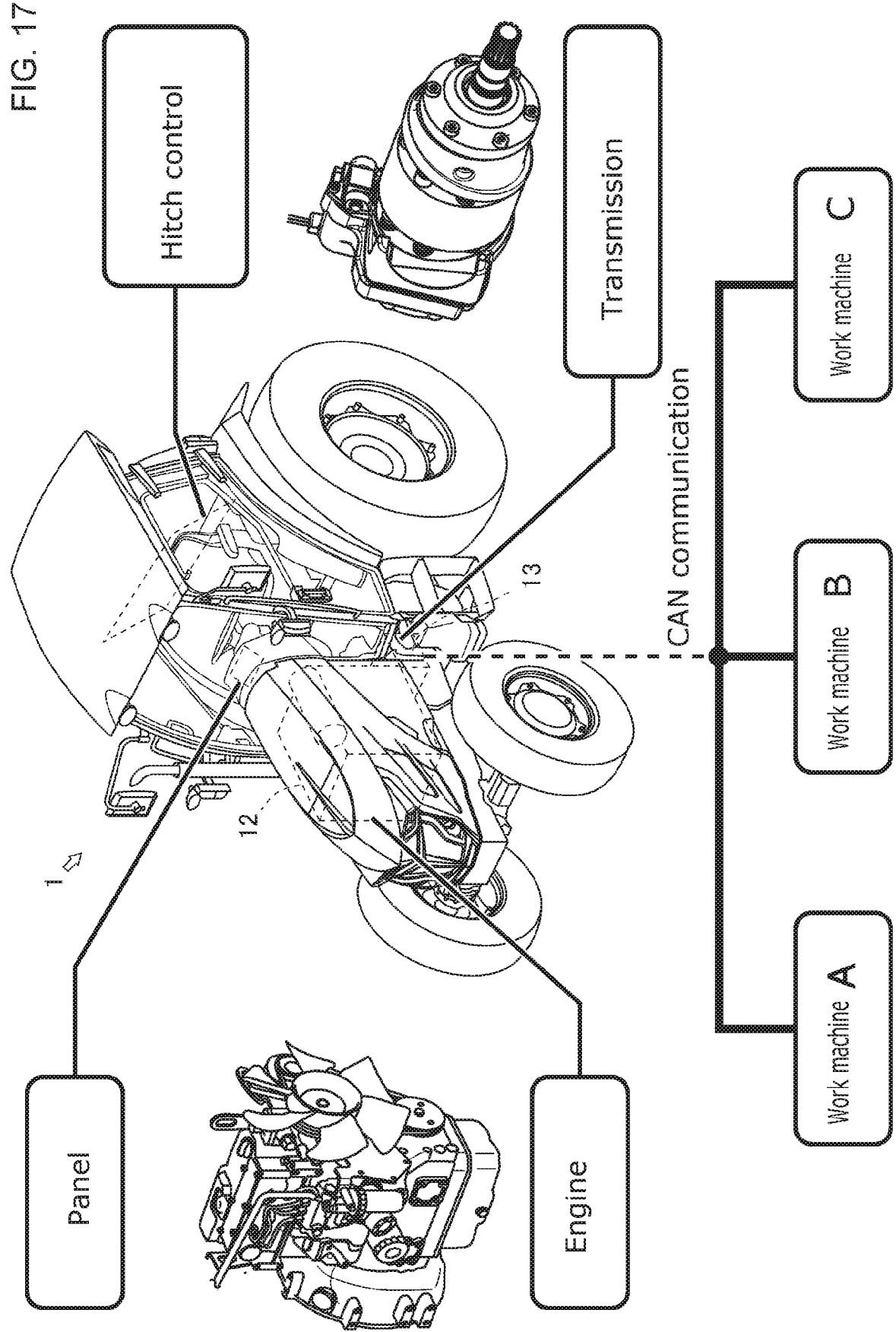
FIG. 17 shows an information network of the tractor.

The work machine link system is a system in which the tractor 1 and the work machine communicate with each other bidirectionally to reduce the burden of the operator in operability, work efficiency, and the like. Referring to FIGS. 9 and 17, ECUs in the tractor 1 such as the engine 12, the instrument panel (meters) 170, the transmission 13, a UFO (not shown), and the display 2, are connected with each other via a CAN and integrally controlled.

Figure 18:
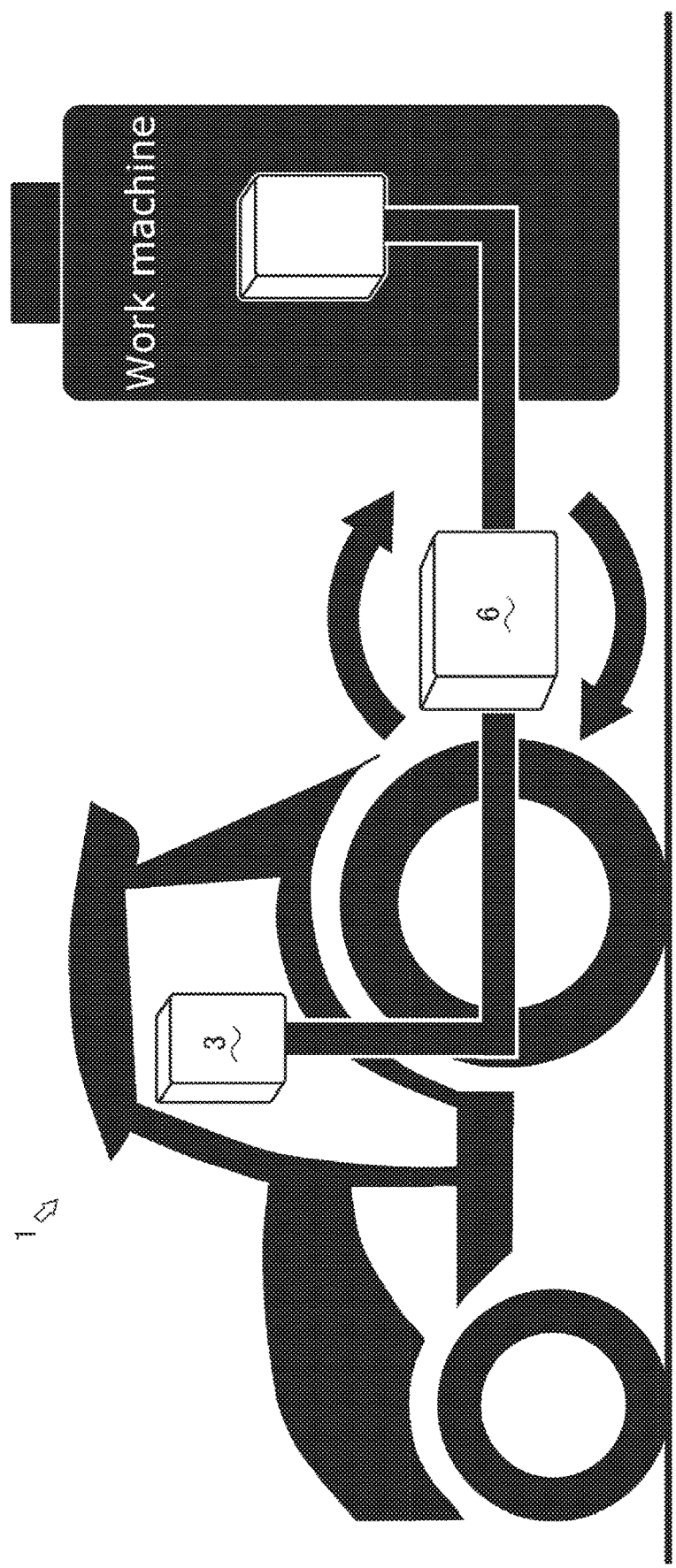
FIG. 18 shows a connection between the tractor and the work machine that form the information network.

Referring to FIG. 18, a work machine such as the front loader 80 is connected to the tractor 1 and a variety of information is exchanged between the tractor 1 and the work machine to achieve a highly advanced control. The information is exchanged via a CAN, and the tractor 1 and the work machine are connected with each other through a communication connector 6 in compliance with the JAMMA standards (AG-PORT). A controller of the work vehicle (communication control unit such as an interface and an ECU connected to CAN) and a controller of the work machine (including another interface and ECU connected to CAN) can be linked to each other through an AG-PORT or an ISOBUS.

The work machine can be operated by operating the operation tools (such as the above joystick lever 8, the accelerator lever 172, and the shift lever 163) according to the state of the tractor 1. In other words, the operation of the work machine can be assigned to the operation tools of the tractor 1 (main machine). This achieves integral operability between the tractor 1 and the work machine. In other words, the engine rotation, PTO rotation, traveling speed, and position (the vertical position and the inclination of the work machine) and the like can be appropriately adjusted according to the operation state of the work machine. In this manner, the tractor 1 and the work machine communicate with each other bidirectionally, and thus an integrated operation can be achieved.

Note that the operator can make various settings of the work machine attached to the tractor 1 by operating the control panel 171 of the tractor 1 (see FIG. 7). The control panel 171 is disposed behind the accelerator lever 172, but may be disposed at another position in the vicinity of the operator seat 161.

The configuration of a CAN of the tractor 1 will be described below.

Figure 19:
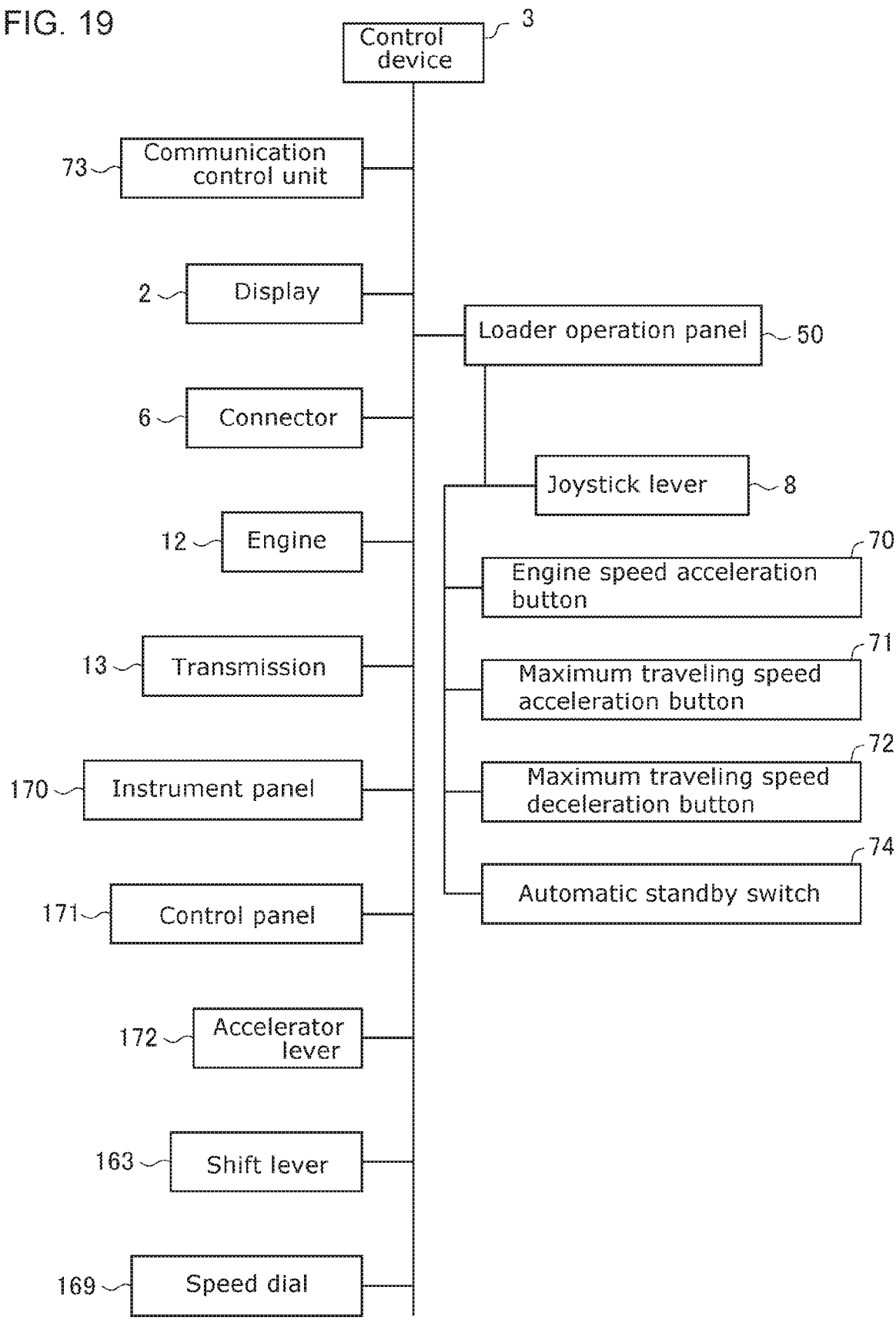
FIG. 19 is a block diagram showing the information network of the tractor.

Referring to FIG. 19, the tractor 1 is provided with a CAN network. The various components of the tractor 1, such as the engine 12, the transmission 13, the display 2, the instrument panel 170, the shift lever 163, the accelerator lever 172, and the speed dial 169 are connected to the network. The CAN of the tractor 1 is connected with a communication control unit 73 that is configured to perform communication control of the network. The communication control unit 73 may be included in the control device 3 (see FIG. 11).

The communication control unit 73 is configured to communicate with the components of the tractor 1 (e.g., the engine 12, the transmission 13, and the like) to control the engine speed, a gear ratio of the transmission 13, and the like. For example, the communication control unit 73 acquires the amount of operation of the accelerator lever 172 and communicates with the engine 12 to change the engine speed according to the amount of operation of the accelerator lever 172. With this configuration, the operator can obtain a desired engine speed by operating the accelerator lever 172. At this time, the communication control unit 73 changes the engine speed not to exceed the speed set by the speed dial 169.

The communication control unit 73 also acquires the amount of operation of the shift lever 163 and communicates with the transmission 13. The communication control unit 73 communicates with the transmission 13 to change a tilt angle of a movable swash plate of a hydraulic pump in the continuously variable transmission of the transmission 13 according to the amount of operation of the shift lever 163. With this configuration, the operator operates the shift lever 163 to continuously change the rotation speed of a gear shift output shaft (not shown) of the transmission 13. As a result, the traveling speed of the tractor 1 is changed steplessly.

The front loader 80 is connected to the CAN of the tractor 1. Specifically, the joystick lever 8 of the front loader 80 is connected to the components of the tractor 1 via the CAN. With this configuration, the communication control unit 73 can acquire information about the operation of the joystick lever 8. In addition, the display 2 is connected to the components of the tractor 1 via the CAN. The communication control unit 73 can acquire information about the settings of the front loader 80 set by the display 2.

In addition to the front loader 80, other work machines (work machine A, work machine B, etc.) can be connected to the communication control unit 73. On the other hand, the communication control unit 73 can transmit information about the tractor 1 such as the traveling speed and the engine speed of the tractor 1, to the front loader 80 and other work machines.

In this manner, the work machine such as the front loader 80 and the tractor 1 can communicate with each other via a CAN. With this configuration, the communication control unit 73 can communicate with the components of the tractor 1 such as the engine 12 and the transmission 13 so as to be linked to the operation of the front loader 80. In other words, the communication control unit 73 communicates with the engine 12 and the transmission 13 so that the engine speed, the gear ratio of the transmission 13 and the like can be automatically changed according to the amount of operation of the front loader 80.

In the tractor 1, the communication control unit 73 is configured to automatically increase the engine speed when the load of the front loader 80 increases at the time of the operation of the front loader 80 such as lifting of the arms 82 and the rotation of the bucket 83. With this configuration, the operation oil supplied to the lift cylinder 84 and the rotation cylinder 85 (see FIG. 11) can be automatically increased when the load of the front loader 80 increases, and thus the work by the front loader 80 can be performed smoothly. The operations that increase the load of the front loader 80 include a case where the vertical position of the arms 82 is raised and a case where the bucket 83 is operated in the roll back position.

When the joystick lever 8 of the front loader 80 is operated by the operator, information about the amount of the operation is transmitted to the communication control unit 73. When detecting that the operation load of the front loader 80 is increased based on the acquired information about the operation amount of the joystick lever 8, the communication control unit 73 communicates with the engine 12 to increase the engine speed.

When detecting that the joystick lever 8 of the front loader 80 is returned to the neutral position, the communication control unit 73 communicates with the engine 12 to return the engine speed to the speed just before the automatic increase. With this configuration, the engine speed is automatically returned to the normal speed after the operation load of the front loader 80 is dissolved, and thus a continuous load on the engine 12 can be prevented.

In addition, when the engine speed is automatically increased in the tractor 1, the communication control unit 73 communicates with the transmission 13 to automatically change the gear ratio of the transmission 13 (specifically, automatically changes the tilt angle of the movable swash plate). In this manner, the communication control unit 73 controls the transmission 13 to maintain the rotation of the gear shift output shaft of the continuously variable transmission at a constant speed. In other words, the communication control unit 73 communicates with the transmission 13 so as to automatically change the gear ratio of the transmission 13.

Even when the communication control unit 73 communicates with the engine 12 and the transmission 13 to automatically increase the engine speed, a situation where the traveling speed changes against the operator's intension can be prevented. Therefore, the network of the CAN configured in this manner does not require a condition to prevent a change of the traveling speed against the operator's intension, i.e., the operation of the shift lever 163 to the neutral position and the operation of the clutch pedal 167 (see FIG. 7) by the operator.

As described above, the tractor 1 is configured in such a manner that the engine speed is increased irrespective of the condition of the shift lever 163 in a neutral position, disconnection of the clutch, or the like when the joystick lever 8 is operated to raise the arms 82 or to have the bucket 83 in the roll back position. In this manner, the engine speed can be automatically changed even when the tractor 1 is traveling, for example.

It should be noted that the engine speed cannot be changed by the operation of the joystick lever 8 at all timings intended by the operator. When the joystick lever 8 is in the neutral position, for example, the communication control unit 73 does not automatically increase the engine speed.

The engine speed can be surely changed at an arbitrary timing by operating the accelerator lever 172. However, when the operator is intended to operate the accelerator lever 172 while operating the steering wheel 164 with one hand for example, the operator has to let go of the joystick lever 8. In addition, the traveling speed changes as the engine speed is changed by the operation of the accelerator lever 172.

However, the tractor 1 is configured in such a manner that the engine speed is increased to the maximum speed while maintaining the traveling speed when the engine speed acceleration button 70 on the joystick lever 8 is operated. When the engine speed acceleration button 70 is operated, the joystick lever 8 transmits the information to that effect to the communication control unit 73. When detecting the operation of the engine speed acceleration button 70, the communication control unit 73 communicates with the engine 12 and the transmission 13 to increase the engine speed to the maximum speed while changing the gear ratio of the transmission 13 so that the rotation of the gear shift output shaft of the continuously variable transmission is maintained at a constant speed (so as to maintain a constant traveling speed).

With this configuration, the operator can increase the engine speed at an arbitrary timing while maintaining a constant traveling speed. Operations such as the operation of the shift lever 163 into the neutral position or stepping of the clutch pedal 167 are not required even when the engine speed is increased by the operation of the engine speed acceleration button 70.

Note that the communication control unit 73 increases the engine speed to a speed set by the speed dial 169. This configuration is advantageous in that the engine speed can be increased to a desired speed of the operator with a simple operation of the engine speed acceleration button 70. In addition, a situation in which the engine speed of the engine 12 is unnecessarily increased can be prevented, since the upper limit of the engine speed is provided.

The joystick lever 8 includes a maximum traveling speed acceleration button 71 and a maximum traveling speed deceleration button 72 (see FIG. 6) that are configured to change the maximum traveling speed. With this configuration, the maximum traveling speed can be changed by the operation of the joystick lever 8. When the maximum traveling speed acceleration button 71 or the maximum traveling speed deceleration button 72 are operated, the joystick lever 8 transmits the information to that effect to the communication control unit 73. When detecting the operation of the maximum traveling speed acceleration button 71, the communication control unit 73 changes the set value so as to increase the maximum traveling speed. When detecting the operation of the maximum traveling speed deceleration button 72, the communication control unit 73 changes the set value so as to lower the maximum traveling speed.

The "maximum traveling speed" used herein refers to a set value of the traveling speed at the time when the accelerator lever 172 is operated to the fullest extent. For example, when the maximum traveling speed is set to be low, a change in the traveling speed relative to the amount of operation of the accelerator lever 172 is reduced. On the other hand, when the maximum traveling speed is set to be high, the change in the traveling speed relative to the amount of operation of the accelerator lever 172 is increased. Accordingly, the settings like this are advantageous in the case where the tractor 1 travels at a relatively high speed, such as at the time of traveling on a road.

A correlation between an amount of operation of the accelerator lever 172 and the traveling speed is changed when a setting of the maximum traveling speed is changed. As a result, a traveling speed corresponding to the current amount of operation of the accelerator lever 172 is changed. Accordingly, when the setting of the maximum traveling speed is changed, the current traveling speed changes without operating the accelerator lever 172. In this manner, changing the setting of the maximum traveling speed can also be utilized for changing the current traveling speed without an operation of the accelerator lever 172.

As the operator operates the joystick lever 8 during the operations using the front loader 80, it is not always easy for the operator to operate the accelerator lever 172 to change the traveling speed. However, the configuration of the present embodiment in which the joystick lever 8 includes the maximum traveling speed acceleration button 71 and the maximum traveling speed deceleration button 72, allows the operator to easily change the traveling speed while grasping the joystick lever 8 (without operating the accelerator lever 172). Accordingly, the operator can concentrate his/her attention on the operation of the front loader 80.

The description now will be made on the setting of a range of increase of the engine speed by using the display 2 instead of the speed dial 169.

When the icon Ic1 is selected and entered on the loader screen S5 (see FIG. 16), an engine speed setting screen S6 is displayed (see FIG. 20) on the display 2. The engine speed setting screen S6 is a screen for setting the range of increase of the engine speed, which is one of the settings of the linked operation between the tractor 1 and the front loader 80. Boxes B1, B2 are vertically arranged on the engine speed setting screen S6. In the box B1, "ON" (displayed in FIG. 20) or "OFF" (hidden instead of "ON" in FIG. 20) can be selected by turning the encoder dial 22. The operator turns the encoder dial 22 to select either of ON or OFF, and presses the enter button 23 to switch between ON and OFF.

The display of ON indicates that the setting is enabled and the engine speed can be automatically increased with the operation of the engine speed acceleration button 70 of the joystick lever 8 (see FIG. 6). The display of OFF indicates that the setting is not enabled and the engine speed cannot be automatically increased even with the operation of the engine speed acceleration button 70. When the setting is enabled, the lamp L1 (see FIG. 16) is highlighted in green.

When ON is selected and entered to enable the setting, the background color of the box B2 is changed, and the setting operation can be made with reference to the display of the box B2. In the box B2, a graph G5, which is a bar graph, and the range of increase to be set are displayed. The left end of the graph G5 indicates a lower most value (i.e., 0) of the range of increase, and the right end of the graph G5 indicates an upper most value of the range of increase. The graph G5 is displayed in black. The graph G5 indicates the range of increase of the engine speed. In the graph G5, an indicator Id1 is displayed in white. At the time of setting the range of increase of the engine speed, the indicator Id1 extends or contracts according to the value. When a desired value is determined, the range of increase is set accordingly. The operator turns the encoder dial 22 to extend or contract the indicator Id1, and presses the enter button 23 to enter the value of the range of increase.

Figure 20:
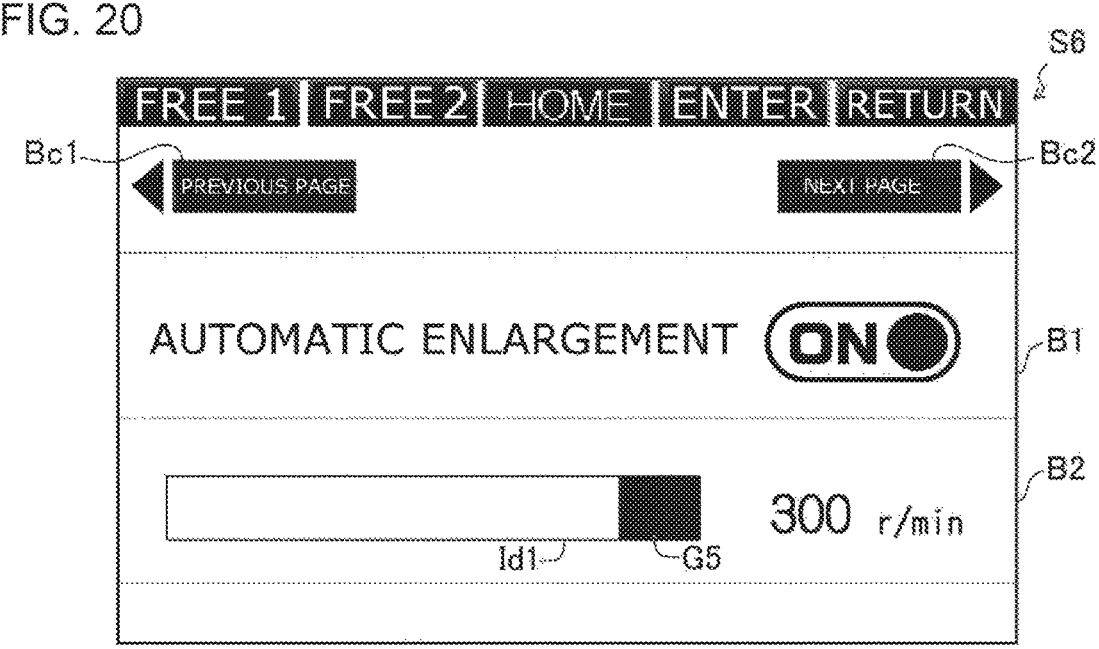
FIG. 20 shows a screen displayed on the display.

A value of the range of increase (r/min) is displayed on the right side of the graph G5. In FIG. 20, "300 r/min" is displayed as a current set value. Note that the range of increase may be set even in a state where the setting of the range of increase of the engine speed is not enabled.

When a button Bc1 marked as "previous page" or an icon marked as "return" is selected and entered on the engine speed setting screen S6, the display returns to the loader screen S5. When a button Bc2 marked as "next page" is selected and entered, a traveling speed setting screen S7 (see FIG. 21) is displayed.

The traveling speed setting screen S7 is a screen for setting a range of increase or reduction of the traveling speed of the tractor 1, which is one of the settings of the linked operation between the tractor 1 and the front loader 80. Boxes B4, B5, B6 are vertically arranged in this order from top to bottom on the traveling speed setting screen S7. In the box B4, "ON" (displayed in FIG. 21) or "OFF" (hidden instead of "ON" in FIG. 21) can be selected by turning the encoder dial 22.

The display of ON indicates that the setting is enabled and the traveling speed can be automatically increased with the operation of the maximum traveling speed acceleration button 71 of the joystick lever 8 (see FIG. 6) and automatically decreased with the operation of the maximum traveling speed deceleration button 72 (see FIG. 6). The display of OFF indicates that the setting is not enabled and the traveling speed cannot be automatically changed even with the operation of the maximum traveling speed acceleration button 71 or the maximum traveling speed deceleration button 72.

When ON is selected and entered to enable the setting, the background color of the box B5 is changed, and the setting operation can be made with reference to the display of the box B5. In the box B5, a graph G6, which is a bar graph, and the range of increase to be set is displayed. The left end of the graph G6 indicates a lower most value (i.e., 0) of the range of increase, and the right end of the graph G6 indicates an upper most value of the range of increase. The graph G6 is displayed in black. The graph G6 indicates the range of increase of the traveling speed. In the graph G6, an indicator Id2 is displayed in white. At the time of setting the range of increase of the traveling speed, the indicator Id2 extends or contracts according to the value. When a desired value is determined, the range of increase is set accordingly. The operator turns the encoder dial 22 to extend or contract the indicator Id2, and presses the enter button 23 to enter the value of the range of increase.

When the range of increase is set, the background color of the box B6 is changed, and the setting operation can be made with reference to the display of the box B6. In the box B6, a graph G7, which is a bar graph, and the range of reduction to be set is displayed. The right end of the graph G6 indicates an upper most value (i.e., 0) of the range of reduction, and the left end of the graph G7 indicates a lower most value of the range of reduction. The graph G7 is displayed in black. The graph G7 indicates the range of reduction of the traveling speed. In the graph G7, an indicator Id3 is displayed in white. At the time of setting the range of reduction of the traveling speed, the indicator Id3 extends or contracts according to the value. When a desired value is determined, the range of reduction is set accordingly. The operator turns the encoder dial 22 to extend or contract the indicator Id3, and presses the enter button 23 to enter the value of the range of reduction.

Figure 21:
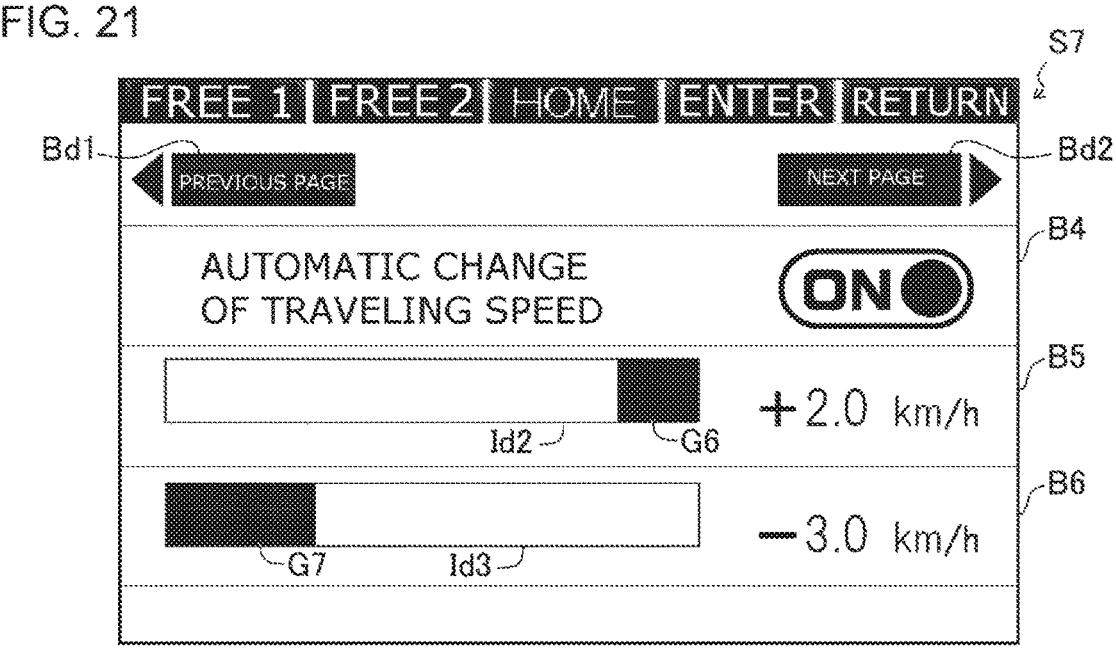
FIG. 21 shows a screen displayed on the display.

A value of the range of increase and a value of the range of reduction (km/h) are respectively displayed on the right side of the graphs G6, G7. In FIG. 21, "+2.0 km/h" and "−3.0 km/h" are displayed as current set values. Note that the range of increase and the range of reduction may be set even in a state where the setting to change the traveling speed is not enabled.

When a button Bd1 marked as "previous page" or an icon marked as "return" is selected and entered on the traveling speed setting screen S7, the display returns to the engine speed setting screen S6 (see FIG. 20). When a button Bd2 marked as "next page" is selected and entered, the display returns to the loader screen S5 (see FIG. 16).

The description now will be made on an automatic standby function of the front loader 80, which is one of the settings of the linked operation of the tractor 1 and the front loader 80. The automatic standby used herein refers to a function of automatically setting the bucket 83 and the arms 82 at a set angle and a set vertical position respectively. The arms 82 and the bucket 83 are suspended after automatically moved to the respective set positions, thereby reducing the operation of the joystick lever 8 by the operator.

Figure 22:
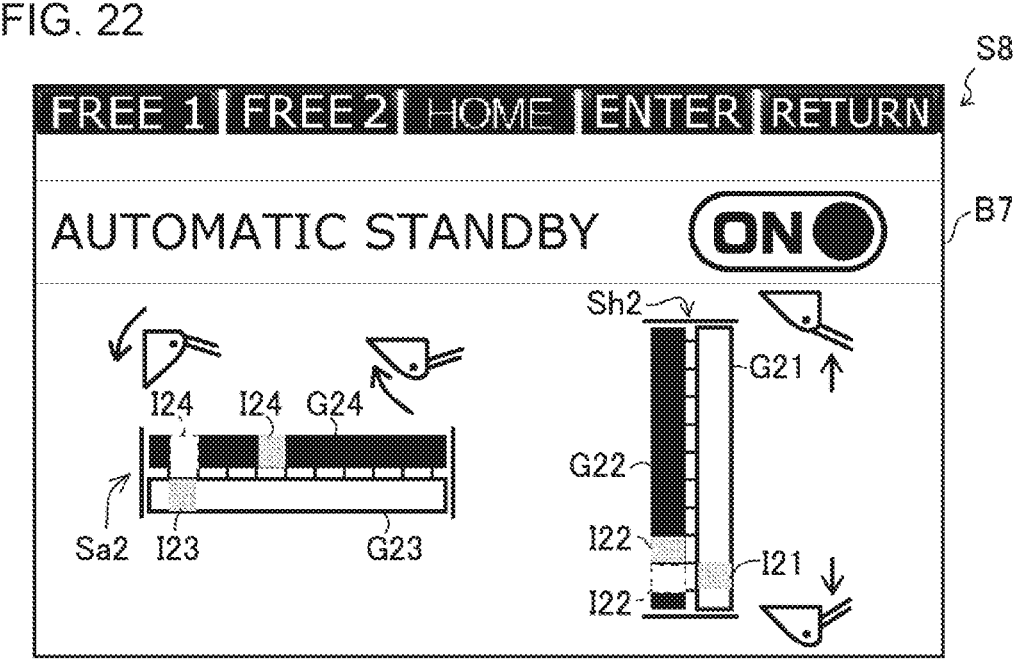
FIG. 22 shows a screen displayed on the display.

When the icon Ic3 is selected and entered on the loader screen S5 (see FIG. 16), an automatic standby setting screen S8 is displayed on the display 2 (see FIG. 22). The automatic standby setting screen S8 is a screen for enabling or not enabling the automatic standby function. The angle of the bucket 83 and the vertical position of the arms 82 during the automatic standby state can also be set on the automatic standby setting screen S8. On the automatic standby setting screen S8, a box B7 is displayed. In the box B7, "ON" (displayed in FIG. 22) or "OFF" (hidden instead of "ON" in FIG. 22) can be selected by turning the encoder dial 22.

The display of ON indicates that the setting is enabled and the front loader 80 can be automatically moved to the set position for storage with the operation of the automatic standby switch 74 of the joystick lever 8 (see FIG. 6). The display of OFF indicates that the setting is not enabled and the front loader 80 cannot be automatically moved to the set position for storage even with the operation of the automatic standby switch 74. When the setting is enabled, the lamp L3 (see FIG. 16) is highlighted in green.

Note that the tractor 1 configured to be equipped with the front loader 80 has a floating function. The floating function, which is a function of automatically following (floating) the irregularities of the workplace, eliminates the need for complicated operations of the joystick lever 8 by the operator to adjust the angle of the bucket 83 and the vertical position of the arms 82. When the floating function is enabled, a predetermined lamp on the display 2 is highlighted for example in green.

On the automatic standby setting screen S8, a ruler Sh2, a ruler Sa2, and graphs G21, G22, G23, G24 are displayed.

The ruler Sh2 and the graphs G21, G22 indicate the vertical position information of the bucket 83. The ruler Sh2 and the graphs G21, G22 are vertically arranged on the automatic standby setting screen S8. The ruler Sh2 is displayed between the graph G21 and the graph G22.

The ruler Sa2 and the graphs G23, G24 indicate the angle information of the bucket 83. The ruler Sa2 and the graphs G23, G24 are laterally arranged on the automatic standby setting screen S8. The ruler Sa2 is displayed between the graph G23 and the graph G24.

The graphs G21, G22, G23, G24 are so-called bar graphs. The graphs G21 and G23 are displayed in white. The graphs G22 and G24 are displayed in black. The graphs G21, G22, G23, G24 respectively include indicators I21, I22, I23, I24. The indicators I21, I22, I23, I24 move along the respective graphs G21, G22, G23, G24. Note that the indicators I21 and I23 are displayed in different colors from each other. The indicator I22 and the indicator I24 are displayed in different colors from each other.

The graph G21 indicates the vertical position of the arms 82 for storage, and is used to determine the set position. The indicator I21 moves along the graph G21 according to the set position at the time of setting the vertical position of the arms 82 for storage. The operator turns the encoder dial 22 to move the indicator I21, and presses the enter button 23 to determine the set position. The indicator I22 displayed on the graph G22 indicates the current set position of the arms 82 for storage. When the set position of the arms 82 is determined, the position of the indicator I22 of the graph G22 is replaced by the determined position corresponding to the indicator I21 of the graph G21 (see indicator I22 shown in the form of dashed lines in FIG. 22).

On the other hand, the graph G23 indicates the angle of the bucket 83 for storage, and is used to determine the set angle. The indicator I23 moves along the graph G23 according to the set angle at the time of setting the angle of the bucket 83 for storage. The operator turns the encoder dial 22 to move indicator I23, and presses the enter button 23 to determine the set angle. The indicator I24 displayed on the graph G24 indicates the current set angle of the bucket 83 for storage. When the set angle of the bucket 83 is determined, the position of the indicator I24 of the graph G24 is replaced by the determined position corresponding to the indicator I23 of the graph G23 (see the indicator I24 shown in the form of dashed lines in FIG. 22).

When an icon marked as "return" is selected and entered on the automatic standby setting screen S8, the display returns to the loader screen S5 (see FIG. 16).

Figure 23:
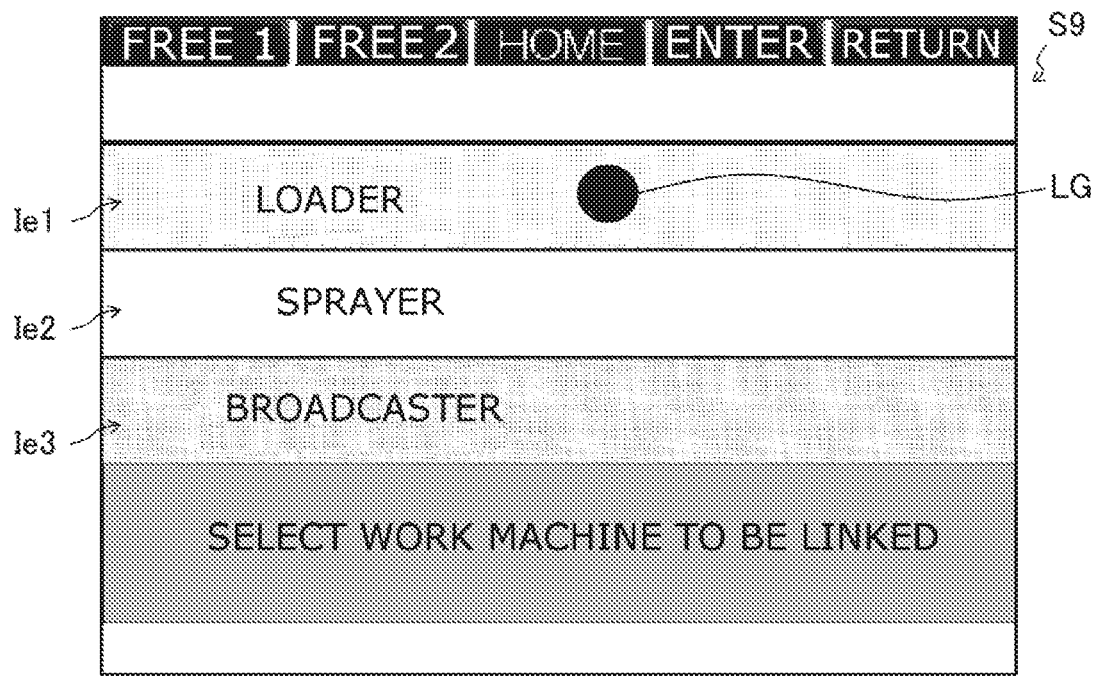
FIG. 23 shows a screen displayed on the display.

On the other hand, when an icon Ic4 is selected and entered on the loader screen S5 (see FIG. 16), a work machine linkage screen S9 is displayed on the display 2 (see FIG. 23). On the work machine linkage screen S9, three icons Ie1, Ie2, Ie3, each of which shows the name of a work machine and the display of ON or OFF, are displayed.

The icons Ie1, Ie2, Ie3 form a list of work machines that are linkable to the tractor 1. The icons Ie1 and Ie2 respectively indicate the linkable work machines that are attached to the tractor 1, and are displayed in a selectable manner. The green lamp LG is turned on in the icon Ie1. On the other hand, the icon Ie3 indicates a work machine that is linkable to but is not attached to the tractor 1, and is displayed in an unselectable manner. The icon Ie3 is displayed in gray which means the icon cannot be selected. The icon Ie3 cannot be selected by turning the encoder dial 22.

Accordingly, the operator turns the encoder dial 22 to select desired one of the icons Ie1 and Ie2 on the work machine linkage screen S9, and presses the enter button 23 to switch between ON and OFF. The display of ON indicates that the work machine is linked to the tractor 1, and the display of OFF indicates that the work machine is not linked to the tractor 1.

Referring to FIG. 23, the icon Ie3 cannot be selected. When either the icon Ie1 or the icon Ie2 is determined, if any one of the work machines is linked to the tractor 1, the display of one of the icons Ie1 and Ie2 corresponding thereto is changed from ON to OFF to indicate the work machine is not in a linked state, and the display of the icon Ie1 or Ie2 corresponding to the determined one of the work machine is changed from OFF to ON to indicate that the work machine is in a linked state. Only one work machine is linked to the tractor 1 at a time.

As shown in FIG. 23, when the setting is enabled through the icon Ie1 to link the front loader 80 to the tractor 1 (main device), the lamp L4 (see FIG. 16) is highlighted in green. When any one of the work machines is set to be linkable to the tractor 1 (main device), a lamp on the instrument panel 170 (see FIG. 9) is turned on to indicate the linkable work machine. Note that the display of the lamp includes the same figure as that included in the icon Ic4 (see FIG. 16).

Note that the range of increase of the engine speed, the range of increase and reduction of the traveling speed, the automatic standby state, the floating function, and the linkage operation with the work machine to have the front loader 80 be linked to the tractor 1 can also be set by using the loader operation panel 50. Referring to FIG. 19, the loader operation panel 50 is connected to each component of the tractor 1 via the CAN. The loader operation panel 50 can be disposed in the vicinity of the operator seat 161.

Figure 24:
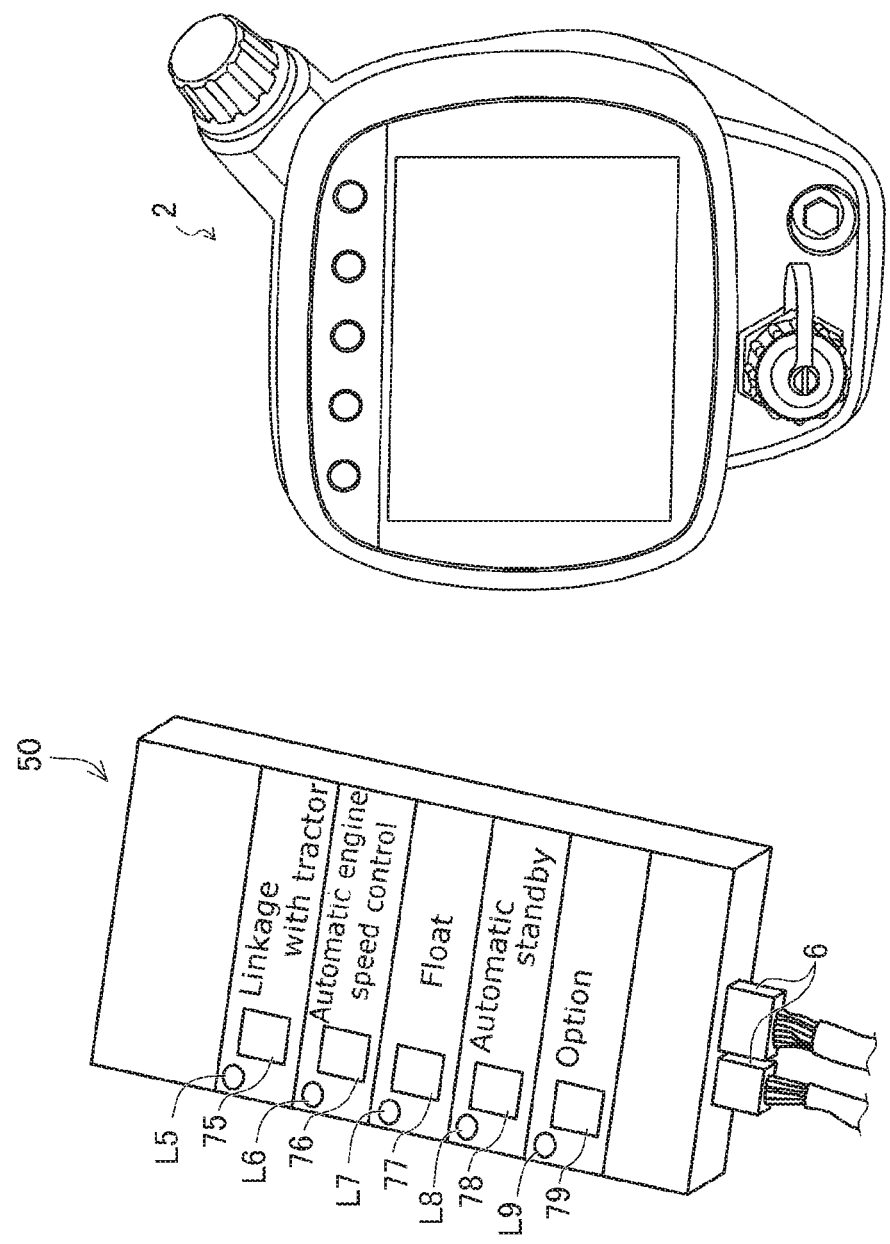
FIG. 24 shows a loader operation panel.

The loader operation panel 50 disposed in the vicinity of the display 2 as shown in FIG. 24 allows the operator to easily make the various settings while checking the information displayed on the display 2. The loader operation panel 50 includes a linkage button 75. Enablement/non-enablement of functions to link the front loader 80 to the tractor 1 can be collectively set with the linkage button 75. When the operator presses the linkage button 75, the communication control unit 73 collectively enables a plurality of functions to link the front loader 80 to the tractor 1, and collectively disables a plurality of functions to link another work machine to the tractor 1. When the linkage button 75 is pressed again, the communication control unit 74 comprehensively turns off the plurality of functions to link the front loader 80 with the tractor 1.

In view of the above, the plurality of functions to link the front loader 80 to the tractor 1 can be collectively switched between an enabled state and a non-enabled state by simply operating the linkage button 75. Note that a lamp L5 is provided on the left side of the linkage button 75. The lamp L5 is turned off when the linkage with the tractor 1 is not enabled, and is turned on when the linkage with the tractor 1 is enabled. The state of the lamp L5 allows the operator to visually confirm the linkage state between the front loader 80 and the tractor 1.

The loader operation panel 50 also includes setting buttons 76, 77, 78, 79 allotted for respective functions. The setting button 76 is an operation tool configured to enable or disenable the function of the automatic increase of the engine speed. The setting button 77 is an operation tool configured to enable or disenable the floating function. The setting button 78 is an operation tool configured to enable or disenable the automatic standby function. The setting button 79 is an operation tool configured to enable or disenable the other function. The other function includes a setting of the vertical position setting information and the angle setting information of the front loader 80.

When one of the setting buttons 76, 77, 78, 79 is operated, the communication control unit 73 enables or disenables only a function corresponding to the one of the setting buttons 76, 77, 78, 79 among the functions to link the front loader 80 to the tractor 1.

Note that lamps L6, L7, L8, L9 are arranged on the left side the setting buttons 76, 77, 78, 79, respectively. The lamps L6, L7, L8, L9 are turned off when the functions corresponding to the respective setting buttons 76, 77, 78, 79 are disenabled, and are turned on when the functions corresponding to the respective setting buttons 76, 77, 78, 79 are enabled. The lamp L9 is turned off when the function of setting the vertical position setting information and the angle setting information of the front loader 80 is disenabled, and turned on when this function is enabled. When the function of setting the vertical position setting information and the angle setting information of the front loader 80 is enabled, the lamp L2 (see FIG. 16) on the display 2 is also switched from a turned-off state to a turned-on state. In the same manner, the lamps L1, L3 are turned off when the functions corresponding to the setting buttons 76, 78 are disenabled, and the lamps L1, L3 are turned on when these functions are enabled.

INDUSTRIAL APPLICABILITY

The present invention is applicable to a work vehicle having a display.

DESCRIPTION OF REFERENCE SIGNS

1: tractor (work vehicle)
2: display
3: control device (control section)
80: front loader (work machine)
83: bucket
G1: graph (vertical position information)
G2: graph (vertical position information)
G3: graph (angle information)
G4: graph (angle information)
I1: indicator (synchronized vertical position information)
I2: indicator (vertical position setting information)
I3: indicator (synchronized angle information)
I4: indicator (angle setting information)
S5: loader screen
S6: engine speed setting screen
S7: traveling speed setting screen
S8: automatic standby setting screen
S9: work machine linkage screen

The invention claimed is:

1. A work vehicle including a work machine with a bucket, the work machine configured to freely raise/lower and rotate the bucket, the work vehicle comprising:
   a display comprising a screen and configured to be disposed near an operator seat of a work vehicle; and
   wherein the display is configured to display the screen having a single-axis linear gauge associated with a vertical position of the bucket, the single-axis linear gauge including:
      a gauge axis corresponding to a vertical position range of the bucket; and
      an indicator, the indicator of the single-axis linear gauge is moveable along the gauge axis based on vertical position information of the bucket.

2. The work vehicle according to claim 1, wherein the screen includes an operation section icon configured to set an index of a vertical position of the bucket.

3. The work vehicle according to claim 1, wherein:
   the display is configured to concurrently display a plurality of graphs on the screen; and
   the plurality of graphs include:
      the single-axis linear gauge configured to display an actual vertical position of the bucket of the work vehicle; and
      a gauge configured to display rotational information associated with of the bucket.

4. The work vehicle according to claim 3, wherein:
   the indicator is configured to move upward or downward along the gauge axis of the single-axis linear gauge in synchronization with an upward/downward movement of the bucket; and
   the gauge comprises:
      a set of tick marks associated with a range of rotation, and
      an indicator, the indicator of the gauge configured to move with respect to the set of ticks marks based on a scooping angle of the bucket.

5. The work vehicle according to claim 4, wherein:
   the screen includes one or more selectable icons;
   the gauge configured to display the rotational information includes a linear axis and the set of ticks marks positioned along the linear axis;
   the display is further configured to display the screen having another single-axis linear gauge, the other single-axis linear gauge having a second gauge axis and a second indicator configured to move along the second gauge axis based on an user input such that the second indicator is a vertical index of an upward/downward movement of the bucket;
   the display is configured to, based on a selection of a first icon of the one or more selectable icons, set the vertical index at a first position such that the second indicator remains stationary at the first position as the indicator moves on the screen based on the actual vertical position of the bucket; and
   the one or more selectable icons, the gauge axis, the indicator, the second gauge axis, and the second indicator displayed on the screen are distinct visual elements.

6. The work vehicle according to claim 5, wherein:
   the second gauge axis correspond to a predetermined range based on the second indicator; and
   the display is configured to, based on the indicator moving outside the predetermined range, output a notification.

7. A work vehicle including a work machine with a bucket, the work machine configured to freely raise/lower and rotate the bucket, the work vehicle comprising:
- a display comprising a screen and configured to be disposed near an operator seat of a work vehicle; and
- wherein the display is configured to display the screen having:
  - a single-axis linear gauge associated with a vertical position of the bucket; and
  - a gauge associated with a rotation of the bucket, the gauge including:
    - a set of tick marks associated with a range of rotation; and
    - an indicator configured to move with respect to the set of tick marks to indicate an upward/downward rotation of the bucket.

8. The work vehicle according to claim 7, wherein the gauge is configured to depict a rotation angle of the bucket and the indicator is configured to move from left to right along the screen.

9. The work vehicle according to claim 7, wherein the gauge include:
- a linear axis corresponding to a rotation angle of the bucket; and
- the indicator moveable relative to the linear axis on the screen.

10. The work vehicle according to claim 7, wherein:
- the display is configured to concurrently display a plurality of graphs on the screen; and
- the plurality of graphs include:
  - the gauge including a first axis and a first indicator configured to move relatively along the first axis in synchronization with a clockwise/counter-clockwise rotation of the bucket; and
  - the gauge configured to display a scooping angle of the bucket, the gauge including a second axis and the indicator as a second indicator configured to be set by a user as a rotation index of the clockwise/counter-clockwise rotation of the bucket, the second indicator movable along the second axis.

11. The work vehicle according to claim 10, wherein:
- the display includes one or more icons configured to be selected by an operator; and
- the display is configured to, based on selecting a first icon of the one or more icons, set the rotation index such that the second indicator remains stationary at a position corresponding to the set rotation index as the first indicator moves along the gauge based on the actual rotation angle of the bucket.

12. The work vehicle according to claim 11, wherein:
- the rotation index comprises a predetermined range based on the second indicator; and
- the display is configured to, based on the first indicator moving outside the predetermined range, output a notification.

13. An apparatus comprising:
- a controller configured to be communicatively coupled to a display device configured to be disposed in a cabin of a work vehicle, the controller further configured to:
  - receive position information from a bucket coupled to the work vehicle; and
  - display a first screen via the display device, the first screen comprising:
    - a first linear gauge and a first indicator configured to move on the first screen, relative to the first linear gauge, in synchronization with a movement of the bucket; and
    - a second linear gauge and a second indicator, the second indicator corresponding to an index of the position information of the bucket.

14. The apparatus of claim 13, wherein the position of the bucket corresponds to vertical position information or rotation angle information of the bucket.

15. The apparatus of claim 13, wherein the controller is further configured to:
- display one or more selectable icons via the first screen, concurrently display first and second linear gauges via the first screen of the display device; and
- display a second screen that is different from the first screen.

16. The apparatus of claim 15, wherein the first linear gauge includes a first gauge axis that corresponds to a movable range of the bucket.

17. The apparatus of claim 15, wherein the one or more selectable icons comprise:
- a first icon that, based on a selection of the first icon, is configured to cause the controller to:
  - set the second indicator of the second linear gauge as an index of the position information; and
  - display, via the first screen, the second indicator at a position on a second gauge axis of the second linear gauge that corresponds to the index.

18. The apparatus of claim 17, wherein the second indicator remains stationary on the first screen as a first indicator of the first linear gauge moves relative to a first gauge axis of the first linear gauge based on an actual position of the bucket.

19. The apparatus according to claim 17, wherein the first screen comprises a third linear gauge having a third indicator configured to move on the first screen, relative to a third gauge axis, in synchronization with a movement of the bucket.

20. The apparatus according to claim 19, wherein the first linear gauge is indicative of a vertical position of the bucket and the third linear gauge is indicative of a rotation angle of the bucket.

* * * * *